US007414747B2

(12) United States Patent
Ohta

(10) Patent No.: US 7,414,747 B2
(45) **Date of Patent: *Aug. 19, 2008**

(54) WIRELESS REMOTE PRINTING SYSTEM AND METHOD

(75) Inventor: Yasutoshi Ohta, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 347 days.

This patent is subject to a terminal disclaimer.

(21) Appl. No.: 11/232,503

(22) Filed: Sep. 22, 2005

(65) Prior Publication Data

US 2006/0012828 A1 Jan. 19, 2006

Related U.S. Application Data

(63) Continuation of application No. 09/798,628, filed on Mar. 2, 2001, now Pat. No. 6,980,319.

(30) Foreign Application Priority Data

Mar. 10, 2000 (JP) ............................. 2000-067815
Dec. 26, 2000 (JP) ............................. 2000-395653

(51) Int. Cl.
*G06F 15/00* (2006.01)
*G06F 3/12* (2006.01)
*G06K 1/00* (2006.01)
*G06K 15/00* (2006.01)

(52) U.S. Cl. .................................... 358/1.15; 358/1.18

(58) Field of Classification Search ......... 358/1.1–1.18, 358/1.9; 709/201, 203, 219, 224, 228; 710/19, 710/31, 46; 455/3.01, 434
See application file for complete search history.

(56) References Cited

U.S. PATENT DOCUMENTS 6,493,104 B1 * 12/2002 Cromer et al. ............. 358/1.15
6,590,673 B2 * 7/2003 Kadowaki .................. 358/1.15

FOREIGN PATENT DOCUMENTS

| | | |
|---|---|---|
| JP | 07-121324 A | 5/1995 |
| JP | 07-319650 A | 12/1995 |
| JP | 08-101754 A | 4/1996 |
| JP | 8-137776 | 5/1996 |
| JP | 10-191453 | 7/1998 |

(Continued)

OTHER PUBLICATIONS

JP Office Action dated Jul. 20, 2007. [English Summary].

(Continued)

*Primary Examiner*—Douglas Q Tran
(74) *Attorney, Agent, or Firm*—Knoble Yoshida & Dunleavy, LLC

(57) ABSTRACT

The remote printing system allows one user to ultimately send a hard copy to another via a portable digital device such as a cellular phone. Upon receiving an e-mail print notice, the portable digital device wirelessly searches an appropriate print station in the vicinity by broadcasting a signal. In response to the broadcasted search signal, the print stations each send information on their printer characteristics such as availability status and print resolution to the portable digital device, a print server or a client that originated the print request. The recipient of the printer characteristic information selects an appropriate print station based upon a predetermined selection rule.

43 Claims, 23 Drawing Sheets

FOREIGN PATENT DOCUMENTS

| | | |
|---|---|---|
| JP | 11-191081 | 7/1999 |
| JP | 11-348386 A | 12/1999 |

OTHER PUBLICATIONS

Chatschik Bisdikian, Stephane Bouet, Jon Inouye, Riku Metala, Brent Miller, Ken Morley, Thomas Muller, Martin Roter, Eric Slotboom; 1999; Special Interest Group (SIG); Bluetooth Protokol Architecture; pp. 1-20.

Paul Moran,Patric Lind, Patric Olsson, Johannes Elg, Chatschik Bisdikian, Amal Shakeen, John Inouye, Robert Hunter, Brian Redding, Stephanie Bouet, Thomas Muller, Martin Roter; 1999; Special Interest Group (SIG); Bluetooth Security Architecture; pp. 1-33.

Robert Pascoe, Brent Miller; 1999; Special Interest Group (SIG); Mapping Salutation Architecture APIs to Bluetooth Service Discovery Layer; pp. 1-26.

Todor Cooklev, Jon Inouye, Riku Mettala; 1999; Special Interest Group (SIG); Bluetooth PC Card Transport Layer; pp. 1-9.

Carsten Kuhfuss, Magnus Sommansson, George Seuron, Lawrence Jones, Waldemar Hontscha, Wayne Park, John Shi, Brad Tipler; Brian Redding; 1999; Special Interest Group (SIG); Test System Validation Guideline; pp. 1-19.

* cited by examiner

FIG. 7

Exemplary Mail Notice

From:RPrint service <admin@rpsv.ricoh.co.jp>

Subject:New contents arrived

Date:Wed,05 Jan 2000 14:38:52+0900

==

<from>

T.Yamada

<pointer> ftp.ricoh.co.jp/news/001.ps

<comment>

The above file will be delivered for local printing.

WIRELESS REMOTE PRINTING SYSTEM AND METHOD

This is a continuation of prior application Ser. No. 09/798,628 filed on Mar. 2, 2001 now U.S. Pat. No. 6,980,319 under 35 C.F.R. 1.53(b).

FIELD OF THE INVENTION

The current invention is generally related to printing at a convenient location, and more particularly related to a system for and method of printing information at a conveniently located printer station that is selected in a predetermined area.

BACKGROUND OF THE INVENTION

In the recent past, portable digital devices such as personal digital assistants (PDA) have been widely used. To send some information to a user of the portable digital device, unlike a fax machine, the information is directly transmitted to the portable digital device for locally storing before printing it with a local printer. The user having the received information must first find a local printer. Furthermore, for some certain formatted information, the user must run an application program on the portable digital device in order to print the received information.

Japanese Patent Publication Hei 10-191453 discloses a personal handy phone system (PHS)-based method of locally printing information that has been originally inputted through a portable digital assistant (PDA). The disclosure is limited to the information that was inputted only by the PDA. To print the information, the location of the PDA is transmitted to a PHS service center via a PHS base station, and the nearest print station is determined based upon the PDA location. The information to be printed is transmitted to a selected nearest print station either through the service center or directly from the PDA. Hei 10-191453 also discloses the use of a password to identify a bona fide user as well as a fee to be charged to a user for the local printing at predetermined locations such as a convenient store. Furthermore, the prior art reference discloses certain location-dependent parameters for the print stations, and the parameters include the printing fee amount and hours of operation.

Japanese Patent Publication Hei 8-137776 discloses an infra-red (IR) based transmission method of locally printing information as specified by a token stored in a portable digital device. IR is limited to a substantially single direction as well as a transmission distance and capacity. A predetermined number of computers, printers and other peripheral devices is placed at predetermined locations of rooms in a building and is networked by a conventional cable. At least one IR receiver/transmitter is placed in each of the rooms and is shared among the computers, the printers and other peripheral devices in the same room via the network. Thus, when a user moves from one room to another, the portable digital device communicates to a corresponding one of the printers in the room via the IR receiver/transmitter for local printing. The disclosure is unclear as to where computation or processing takes place for the tasks that have been initiated during the communication.

Japanese Patent Publication Hei 11-191081 discloses a transmission method of printing information stored in a network by specifying a task and a file identifier from a portable digital device. The portable digital device transmits the above file and task specification to a host system that is connected to a host of devices such as a printer, a fax machine and a workstation. Upon receiving the file and task specification, the host system in turn processes the tasks on the file. One of the tasks is to print a specified file at a specified printer. The host system and the portable digital device are designed to handle data in multimedia including audio, video, graphics and hand-written information. The prior art disclosure limits the above described communication to only between the portable digital device and the host system.

The above described prior art systems do not allow direct communication between the portable digital device and the peripheral devices such as a printer prior to printing information. Although it makes sense to store the information to be printed at any location, it is desired that the communication between a print station and a portable digital device should be direct.

SUMMARY OF THE INVENTION

In order to solve the above and other problems, according to a first aspect of the current invention, a method of printing information at a convenient location, including: providing a plurality of print stations in a predetermined area, the print stations being networked to a print server which stores information to be printed; sending a first wireless signal from a portable digital device directly to the print stations in the predetermined area; selecting at least one of the print stations based upon a predetermined criterion; sending a selected printer signal from the selected print station to the print server; converting the information into a format acceptable at the selected print station; receiving the information in the converted format to be printed at the selected print station fron the print server; and printing the information at the selected print station.

According to a second aspect of the current invention, a system for printing information at a convenient location, including: a print server storing information to be printed; a plurality of print stations connected to the print server in a predetermined area; and a portable digital device sending a first wireless signal directly to each of the print stations in the predetermined area; wherein the print server determines at least a positional relation between the portable digital device and each of the print stations in response to the first wireless signal, the system selecting at least one of the print stations based upon at least the positional relation, the selected print station sending a selected print station signal to the print server, in response to the selected print station signal, the printer server converting the information into a data format acceptable to the selected print station, the selected print station receiving the information from the print server, and the selected print station printing the received information.

According to a third aspect of the current invention, a system for printing information at a convenient location, including: a print server storing information to be printed; a portable digital device having a wireless communication unit for sending a first wireless non-directional signal in the predetermined area; and a plurality of print stations each having a wireless communication unit for wirelessly communicating directly with the portable digital device in a predetermined area, the print stations being networked with the print server; wherein the print server determining at least a positional relation between the portable digital device and each of the print stations in response to the first wireless non-directional signal, the print server selected one of the print stations that is the closest to the portable digital device based upon the positional relation, the selected print station sending a selected print station to the print server, in response to the selected print station signal, the printer server converting the information into a data format acceptable to the selected print station, the selected print station receiving the information from the print server, and the selected print station printing the received information.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 7 is a diagram illustrating an exemplary e-mail notice to the carrier of the portable digital device.

DETAILED DESCRIPTION OF THE PREFERRED EMBODIMENT(S)

Figure 1:
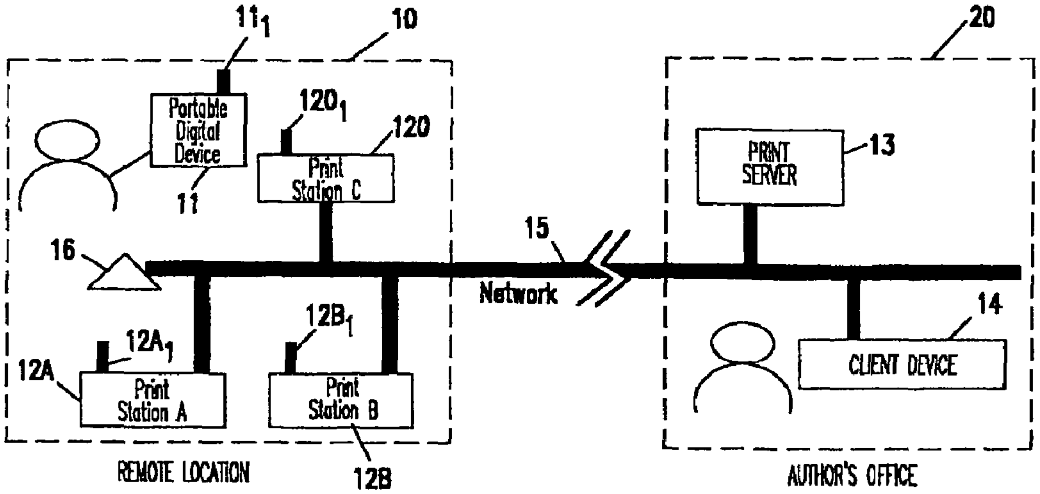
FIG. 1 is a diagram illustrating one preferred embodiment of the remote printing system according to the current invention.
Figure 2:
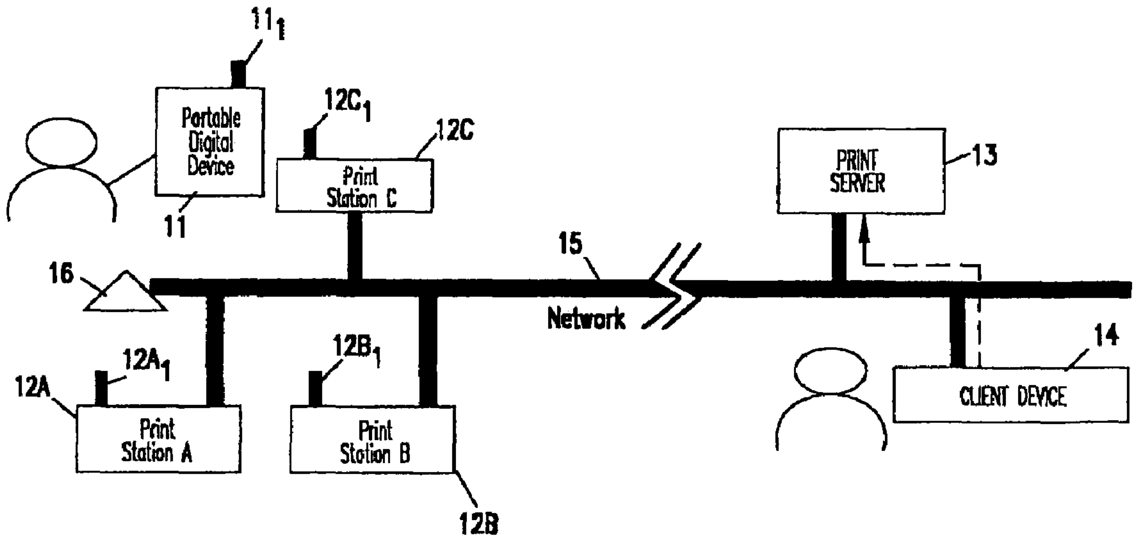
FIG. 2 is a diagram illustrating a first stage of the preferred embodiment of the remote printing system according to the current invention.

Referring now to the drawings, wherein like reference numerals designate corresponding structures throughout the views, and referring in particular to FIG. 1, a diagram illustrates one preferred embodiment of the remote printing system according to the current invention. The remote printing system includes a client device 14, a printer server 13, a plurality of print stations 12A, 12B and 12C, an access point or wireless transmitter/receiver 16 as well as a portable digital device 11. In general, except for the portable digital device 11, all of the above components of the remote printing system are connected physically as well as wirelessly to a cable network 15. One example of the wireless communication protocols is "BlueTooth." The portable digital devices $\mathbf{11}_1$ include a cellular phone, a note-size computer and a personal digital assistant (PDA). The portable digital device 11 is wirelessly connected to the network 15 via a wireless communication unit $\mathbf{11}_1$ and the access point 16. The access point 16 is a relay-station between the cable network 15 and a wireless communication device. The print stations 12A, 12B and 12C each have a corresponding wireless communication unit $\mathbf{12}\mathrm{A}_1$, $\mathbf{12}\mathrm{B}_1$, or $\mathbf{12}\mathrm{C}_1$ to wirelessly as well as directly via the cable network 15 communicate with the portable digital device 11. Furthermore, the print stations 12A, 12B and 12C are either color or black-and-white printers and may share a common page description language or PDL with the print server 13. The print server 13 manages print requests or print jobs in a print queue by storing the print requests and sends each of the print jobs to a specified one of the print stations 12A, 12B and 12C. During the course of printing, if any of the print stations 12A, 12B and 12C develops a problem such as a paper jam, the print server 13 retransmits the print job to the restored print station. When a print job is completed in a normal fashion, the print server 13 releases the corresponding print job from the print queue. The client device 14 includes a personal computer and a workstation.

Referring to FIGS. 2 through 6, diagrams illustrate a various stages of the remote printing according to the current invention. Now particularly referring to FIG. 2, the diagram illustrates a first stage of one preferred embodiment of the remote printing system where an author generates a document at the client device 14 in his office and requests a print job to be delivered to the carrier of the portable digital device 11 by a regular print command. The print command or print job includes information on data to be printed, an origination or print requester, a destination or print receiver, and additional data on the destination or the printer. In response to the print command, the generated document is initially transferred to the print server 13 as indicated by a dotted line and is temporarily stored in the print server 13. Although the data format of the stored document does not have to be a particular format, according to one preferred embodiment of the current invention, a widely used data format such as PostScript (PS) of Adobe or Portable Document Format (PDF) is preferred so that the document is printed at a requested print station even if the supported data format of the print station is not known to the print server 13.

Figure 3:
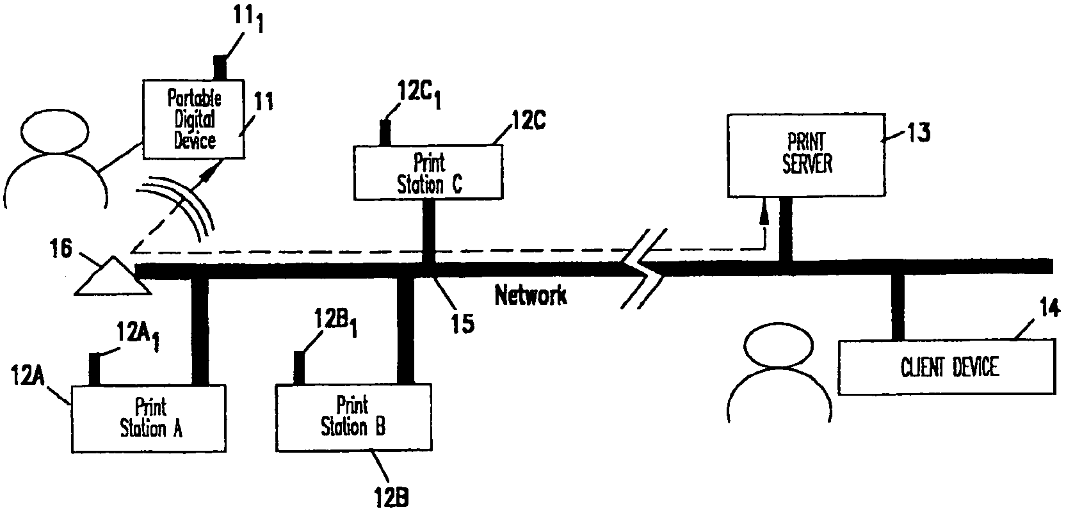
FIG. 3 is a diagram illustrating a second stage of the preferred embodiment of the remote printing system according to the current invention.

Now referring to FIG. 3, the diagram illustrates a second stage of the above preferred embodiment of the remote printing system according to the current invention. In the second stage, the print server 13 sends a print notice signal indicative of the requested print job to the specified portable digital device 11 via the network 15 and the access point 16. The print notice signal includes information on a requester, a desired destination printer type, printing parameters as well as a print data pointer. The print data pointer indicates an address where the data to be printed is stored in the print server 13. For example, the above described print notice signal is implemented as e-mail to the carrier of the specified portable digital device 11. Upon receiving the print notice signal, the portable digital device 11 notifies an arrival of the new e-mail to the carrier of the portable digital device 11 by a visual indicator such as an e-mail icon on a display unit and or an audio signal such as a periodic beep. Thus, the user is notified via e-mail that a copy of a document is to be printed for her in the near future.

Figure 4:
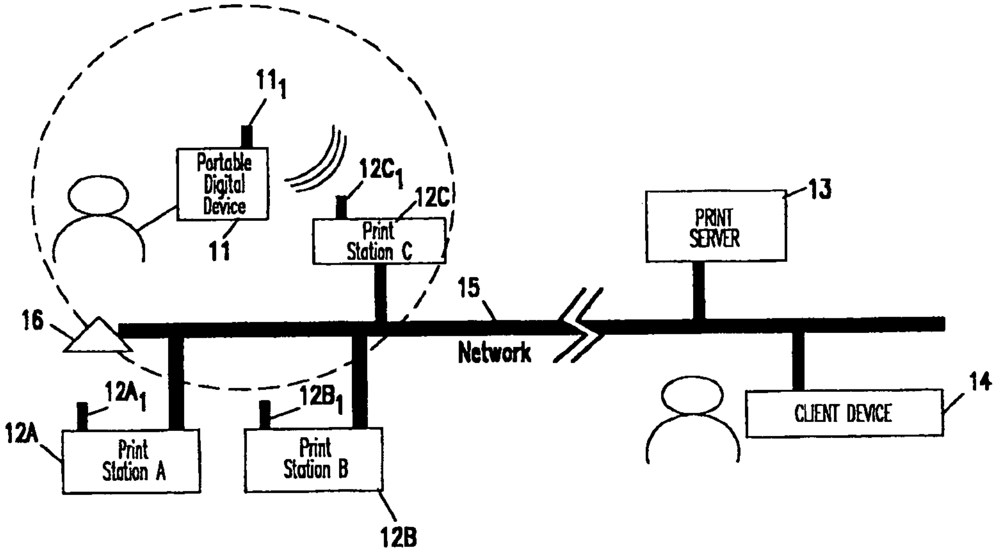
FIG. 4 is a diagram illustrating a third stage of the preferred embodiment of the remote printing system according to the current invention.

Referring to FIG. 4, the diagram illustrates a third stage of the above preferred embodiment of the remote printing system according to the current invention. In the third stage, upon receiving the print notice signal, the portable digital device 11 commences a printer search process by transmitting a first wireless signal. For example, the first wireless signal transmits only within 10 meters according to Class 3 of the BlueTooth transmission protocol and allows a scan and discovery of printers in a limited area. In this example, it is illustrated that the first wireless signal reaches only the print station 12C as indicated by a circle in the dotted line, and only the print station 12C responds to the first wireless search signal. Based in part upon the positional relationship between the portable digital device and the surrounding print stations 12A, 12B and 12C, the portable digital device 11 determines a desired print station to be the print station C or 12C, and the selected print station 12C establishes a wireless connection to the portable digital device 11. The portable digital device user now knows that the print out would be delivered at the selected print station 12C. Although the positional relationship is used as one selection factor in this example, a print type and other print parameters are also used as equally important or deciding selection factors in other examples. Upon establishing the wireless connection, the portable digital device 11 wirelessly sends certain information such as the print data pointer to the selected print station 12C. The above narrow area search is contrasted to a much broader transmission area of other transmission protocols such as Personal Handy-phone System (PHS). Furthermore, the BlueTooth transmission protocol defines separate profiles for receiving devices such as a fax machine, a print station and a portable phone so as to distinguish these receiving devices.

Figure 5:
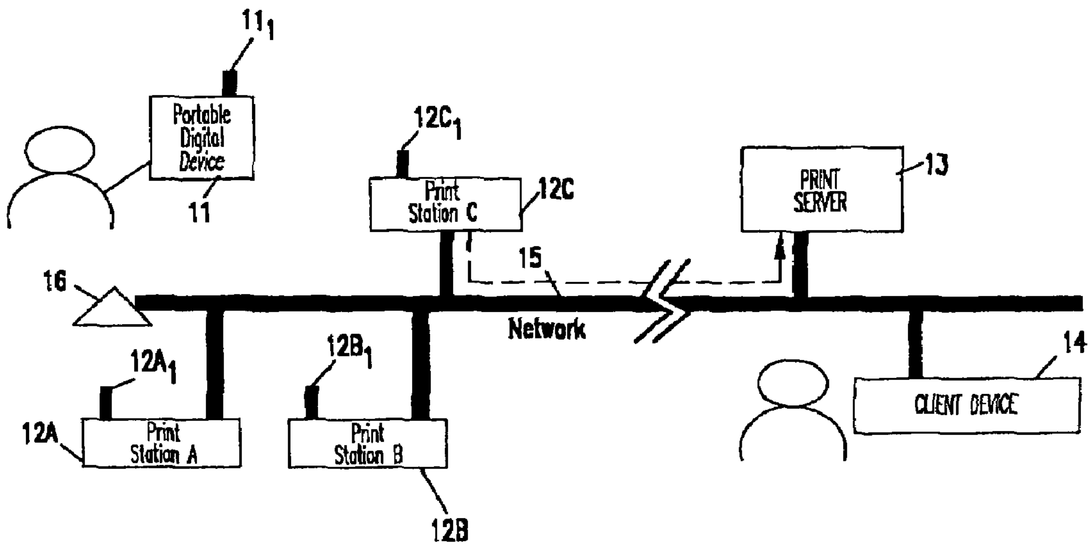
FIG. 5 is a diagram illustrating a fourth stage of the preferred embodiment of the remote printing system according to the current invention.

Referring to FIG. 5, the diagram illustrates a fourth stage of the above preferred embodiment of the remote printing system according to the current invention. In the fourth stage, upon receiving the print data pointer, the selected print station 12C requests print data to be transferred from the print server 13 via the network 15 as indicated by a dotted line. The address in the print data pointer specifies the requested print data that is stored in the print server 13. The print data pointer also specifies a transfer protocol for transferring the requested print data from the print server 13 to the selected print station 12C. For example, file transfer protocol (ftp) is specified to transfer the print data between the print server 13 to the selected print station 12C. As described above, the print server 13 allocates its resource for each transfer process based upon the corresponding priority as managed in the queue.

Figure 6:
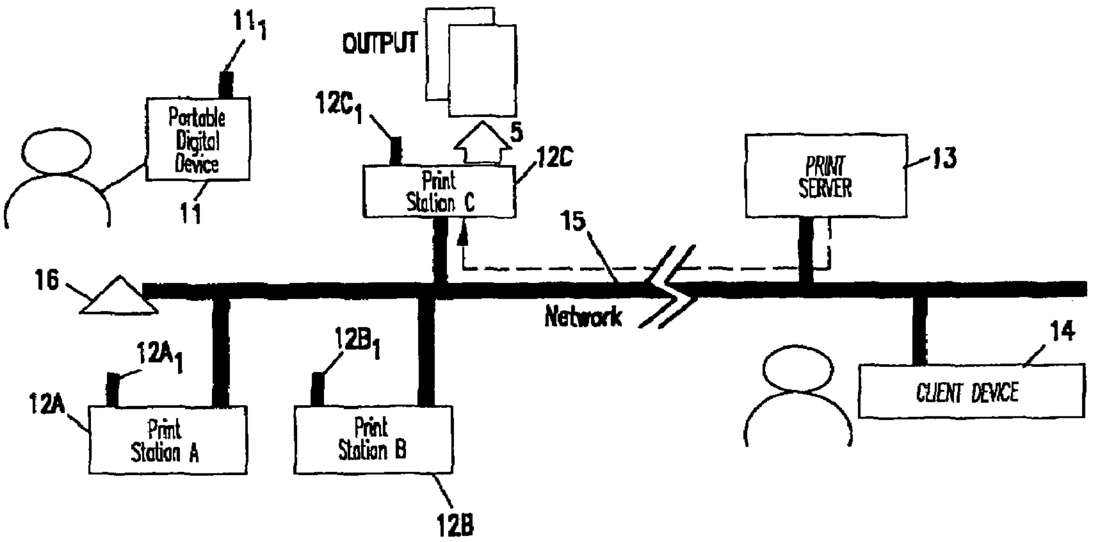
FIG. 6 is a diagram illustrating a fifth and final stage of the preferred embodiment of the remote printing system according to the current invention.

Lastly, referring to FIG. 6, the diagram illustrates a fifth and the final stage of the above preferred embodiment of the remote printing system according to the current invention. In the fifth stage, upon receiving the print data pointer from the selected print station 12C, the print server 13 transfers the requested print data to the selected print station 12C via the network according to the specified protocol as indicted by a dotted line. Upon receiving the transferred print data, the selected print station 12C prints the print data on a specified image-carrying medium such as paper as indicated by an arrow 5. The carrier of the portable digital device 11 collects the print out to complete the remote printing process according to the current station. Upon completion of the requested printing, the selected print station 12C confirms the requested print completion with the print server 13. Optionally, the print server 13 notifies the client device 14 of the print completion so that the original print requester knows of the completion.

In summary, the print requester is able to deliver a hard copy of a desired document to a carrier of the portable digital device 11 at a convenient location for the carrier. At the same time, since the print data pointer is initially transferred to the carrier of the portable digital device 11, only a limited amount of data is wirelessly transferred on air to conserve wireless communication resources. Alternatively, in certain situation, the print requester is also the carrier of the portable digital device 11 provided that the portable digital device is able to communicate with the client device 14 or the print server 13.

FIG. 7 is an exemplary e-mail notice to the carrier of the portable digital device 11. In the second stage of the above preferred embodiment of the remote printing system according to the current invention, the print server 13 sends a print notice signal indicative of the requested print job to the specified portable digital device 11 via the network 15 and the access point 16. The above exemplary e-mail notice displays some information from the print notice signal. This exemplary e-mails displays that the destination that is a print server as well as “T.Ymada” who sends a message “The above file is delivered for local printing.” The print data pointer points to a particular file, “ftp.ricoh.co.jp/news/001.ps” as well as specifies a file transfer protocol as “ftp.”

Figure 8:
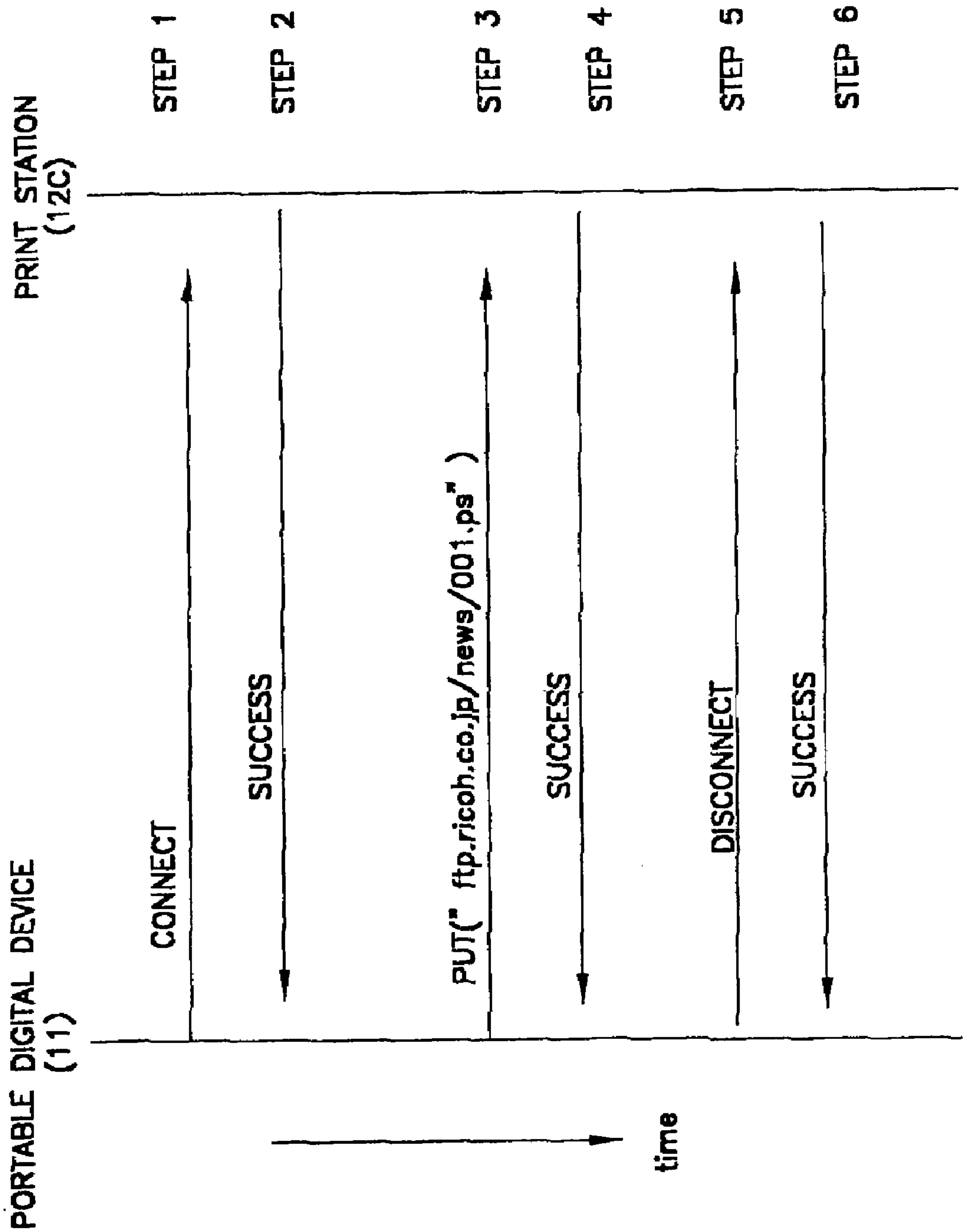
FIG. 8 is a sequence diagram illustrating a sequence of certain steps between the print station and the portable digital device in the above preferred process of remotely printing a document according to the current invention.

FIG. 8 is a sequence diagram illustrating a sequence of certain steps between the print station and the portable digital device in the above preferred process of remotely printing a document according to the current invention. During a first step, the portable digital device 11 broadcasts the wireless command signal, “connect” towards print stations including the print station 12C. In response to the above broadcasted wireless signal, the print station 12C transmits the portable digital device 11 a return wireless signal to indicate a successful connection. When it is determined that the print station 12C is selected as a print station for the current print delivery, the portable digital device 11 sends the selected print station 12C a print data pointer which includes a reference to a file stored at the print server 13 in a third step. In this example, the print data pointer includes the reference information, “ftp.ricoh.co.jp/news/001.ps” and is approximately thirty bytes in size. Upon receiving the print data pointer signal, the selected print station 12C acknowledges the receipt by returning another wireless signal to indicate a successful transmission receipt in a fourth step. After the above described wireless communication takes place, the portable digital device 11 sends the command signal, “disconnect” the previously established connection between the portable digital device 11 and the print station 12C in a sixth step.

Figure 9:
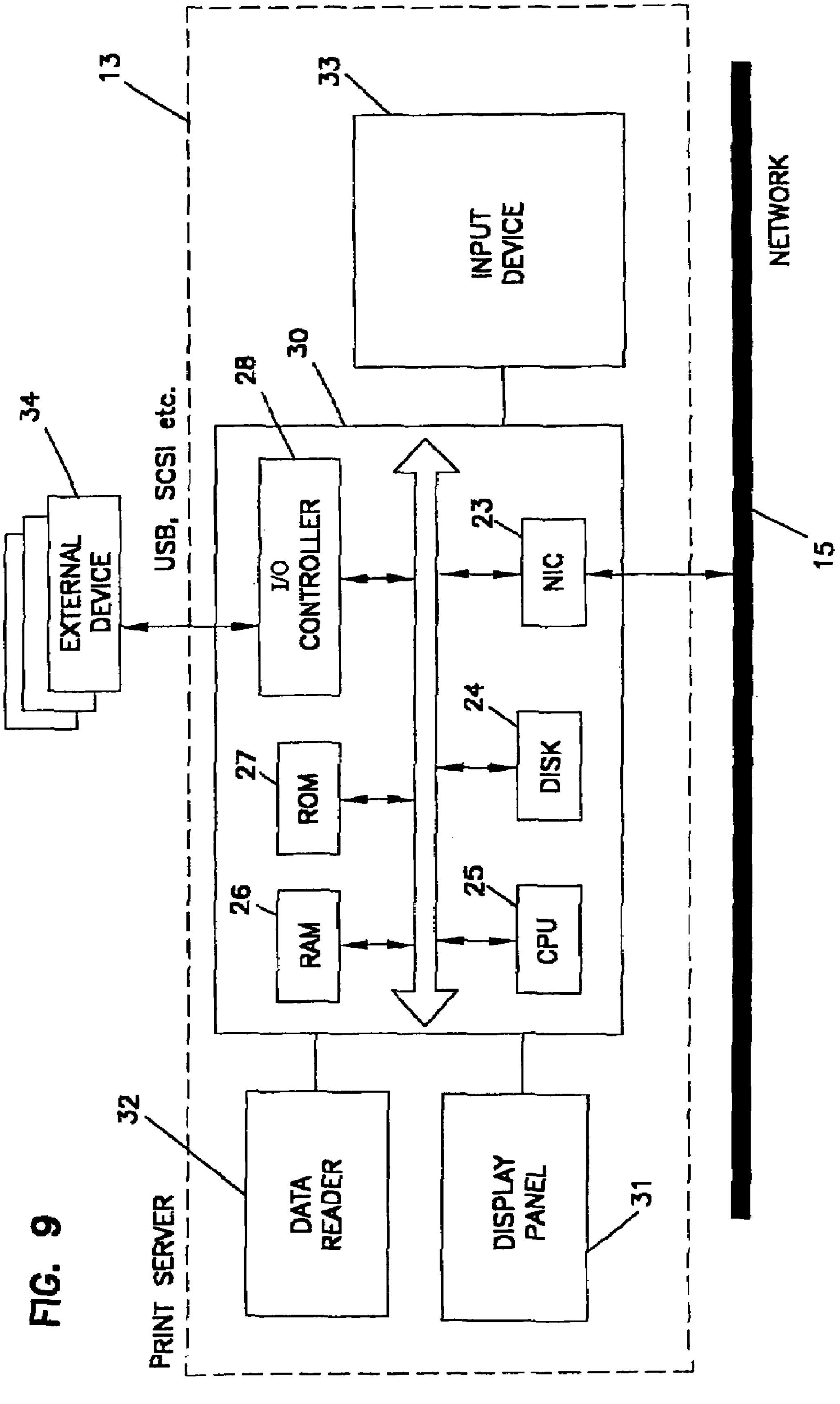
FIG. 9 is a diagram illustrating components of one preferred embodiment of the print server in the remote print system according to the current invention.

Now referring to FIG. 9, a diagram illustrates components of one preferred embodiment of the print server 13 in the remote print system according to the current invention. The print server 13 includes an input device 33 such as a keyboard and a pointing device, a display unit 31 for displaying certain information, a data reader 32 for reading certain information such as a software program, and a process unit 33 for processing information related to print job management. The processing unit 33 further includes a random access memory (RAM) unit 26, a read only memory (ROM) unit 27, an input/output (I/O) controller 28, a central processing (CPU) unit 25, a disk unit 24 and a network interface card (NIC) 23. All of these components in the processing unit 33 are connected by a bus 29. While the I/O controller 28 is interface with external devices 34 through a USB or SCSI port, the NIC 23 is interfaced with the network 15. The disk unit 24 stores an operating system program, application programs such as e-mail processing software, printer device drivers as well as print server management programs such as a print queue management program. Some of the above programs are loaded as UNIX demons or Windows services when a respective operating system is started. Other programs are called in as necessary. Furthermore, the disk unit 24 also temporarily stores data to be printed. The data reader 32 is able to read the software programs from a variety of storage media including a magnetic medium including a floppy disk, an optical medium such as CR-ROM, CD-R, CD-R/W, DVD-ROM, DVD-RAM disks and a magneto-optical medium.

Figure 10:
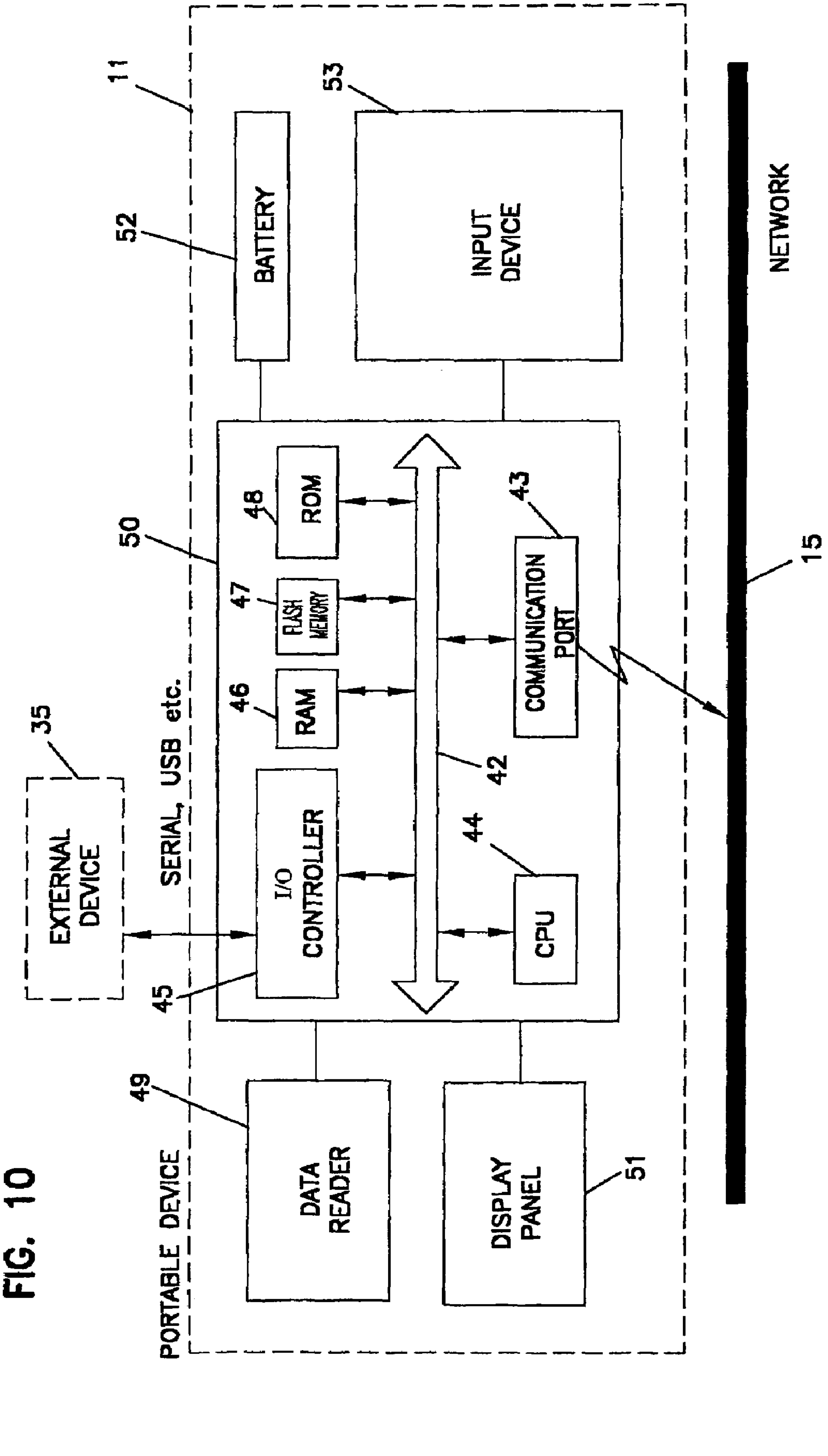
FIG. 10 is a diagram illustrating components of one preferred embodiment of the portable digital device in the remote print system according to the current invention.

Now referring to FIG. 10, a diagram illustrates components of one preferred embodiment of the portable digital device 11 in the remote print system according to the current invention. The portable digital device 11 includes an input device 53 such as a keyboard and a pointing device, a display unit 51 for displaying certain information, a data reader 49 for reading certain information such as a software program, a battery 52, and a process unit 50 for processing information. The processing unit 50 further includes a random access memory (RAM) unit 46, a flash memory unit 47, a read only memory (ROM) unit 48, an input/output (I/O) controller 45, a central processing (CPU) unit 44, a communication port 43. All of these components in the processing unit 50 are connected by a bus 42. While the I/O controller 45 is interface with external devices 35 through a USB or SCSI port, the communication port 43 communicates with the network 15. The ROM unit 48 stores an operating system and application programs such as an e-mail client program and an application program to receive a print data pointer. These programs as well as a visual shell for managing these programs are loaded from the ROM unit 48 into the RAM unit upon booting the operating system program. The processing unit 50 then waits for a user input and or an interrupt from the communication port 43.

Figure 11:
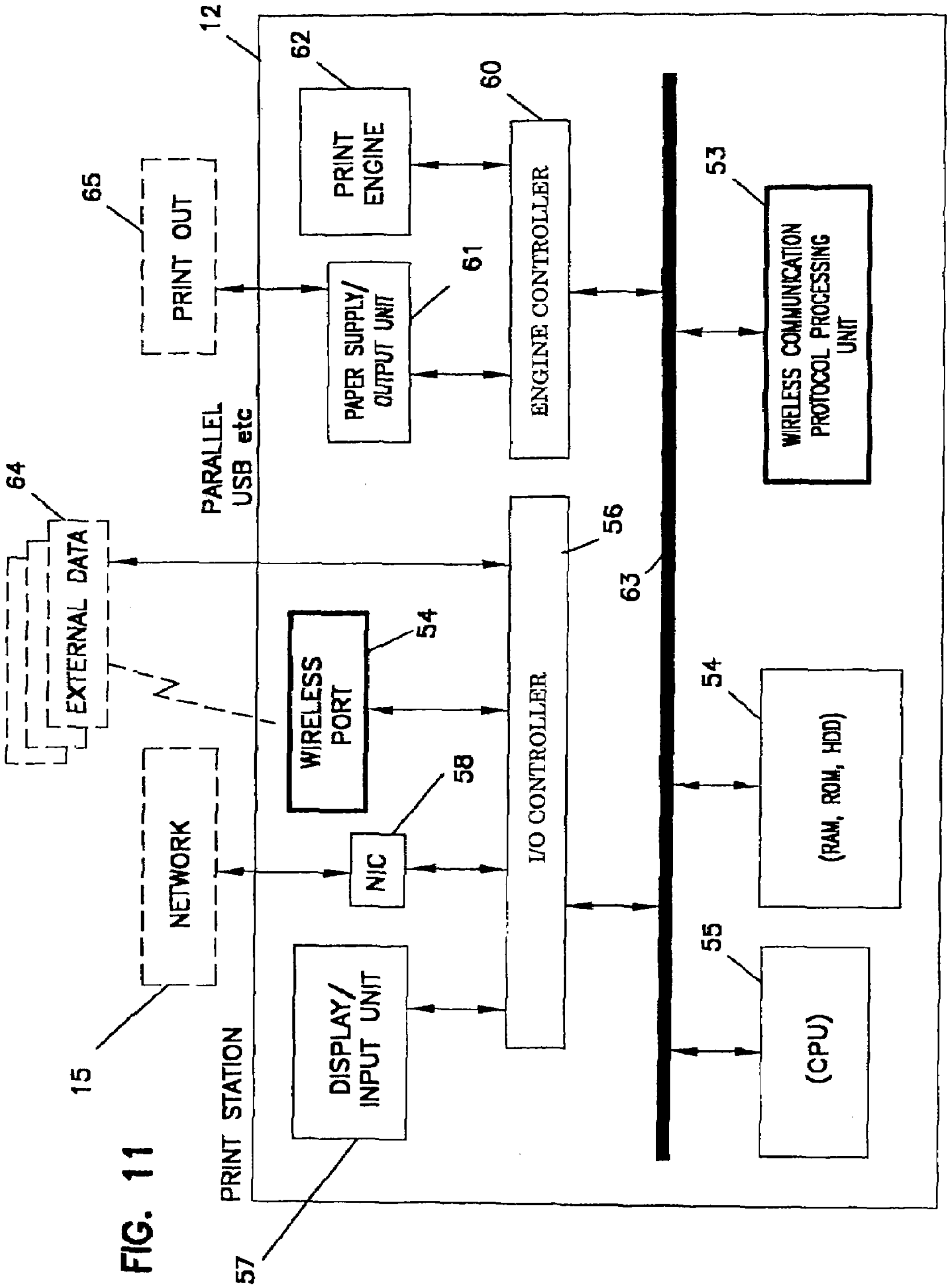
FIG. 11 is a diagram illustrating components of one preferred embodiment of the print station in the remote print system according to the current invention.

Referring to FIG. 11, a diagram illustrates components of one preferred embodiment of the print station 12 in the remote print system according to the current invention. The print station 12 includes a display/input device 57 such as a touch-screen display monitor, a central processing unit (CPU) 55, a memory storage unit 59 including a random access memory (RAM), a read only memory and a hard disk drive (HDD), an input/output (I/O) controller 56, a network interface card (NIC) 58, a communication port 54, a wireless communication protocol processing unit 53, a print engine 62, a paper supply/output unit 61 and a print engine controller 60. A bus 63 connects the CPU 55, the memory storage unit 54, the I/O controller 56, the wireless communication protocol processing unit 53 and the print engine controller 60. The NIC 58 interfaces the print station 12 with the network 15 while the wireless port 54 and the wireless communication protocol processing unit 53 wirelessly connect the print station 12 with external devices 64 such as a portable digital device that is positioned in a predetermined distance. The I/O controller 56 controls the display/input unit 57 and the NIC. The I/O controller 56 also controls the external devices 64 wirelessly via the wireless port 54 as well as directly via parallel and USB ports. Because of the multiple ports or interfaces, a number of external devices are simultaneously connected to the print station 12. The print engine controller 60 controls both the print engine 62 and the paper supply/output unit 61, which supplies and outputs paper to and from the print engine 60. Furthermore, the display/input unit 57 includes a data reader 32 for reading the software programs from a variety of storage media including a magnetic medium including a floppy disk, an optical medium such as CR-ROM, CD-R, CD-R/W, DVD-ROM, DVD-RAM disks and a magneto-optical medium. The data reader 32 temporarily stores the read program in the memory storage unit 59 so that the CPU 55 executes the instructions in the program.

The wireless port 54 and the wireless communication protocol processing unit 53 are implemented as a single unit in alternative embodiments of the print station. In a first alternative embodiment of the print station, the above described single unit is placed within the print station. In a second alternative embodiment, the above described single unit is placed outside of the print station. In a third alternative embodiment, the wireless communication protocol processing unit 53 is implemented as software or firmware so that the replacement with a new communication protocol is facilitated for an upgrade.

In other alternative embodiments of the remote printing system according to the current invention, there are a number of variations within the spirit of the current invention. One of the variations is the print data pointer, and the print data pointer in the alternative embodiment is implemented as a directly structure such as:

“¥doc-srv5¥prt¥meeting1.RPD”

Although the print data pointer was included in an e-mail print notice to the portable digital device in the preferred embodiment, the portable digital device periodically polls the print server to check if a print job request exists in the alternative embodiment. To accommodate a difference in print driver language (PDL) between the print server and the print station, the print server in the alternative embodiment converts the PDL of the print data before transferring the print data to the print station. Furthermore, the alternative embodiment selects an appropriate print station when more than one print station has responded to a wireless search signal from the portable digital device. In one alternative embodiment, for example, the print station status and the printer capability are used in the selection. The print station status is the availability of each print station when the wireless search signal is received. The printer capability includes whether or not a print station is a color printing capability. The above described selection of a print station is performed by the portable digital device, the print server, the client or even one of the print stations.

In still other alternative embodiments of the remote printing system according to the current invention, there are additional variations within the spirit of the current invention. In the preferred embodiment, the remote printing system includes both wireless and cable communication. In the alternative embodiment system, only wireless communication is used among the components. In other words, the print server, the client and each of the print stations wirelessly communicate with each other. In this regard, the client in the alternative embodiment directly transmits the e-mail print notice or the print data pointer to the portable digital device without the involvement of the print server. Similarly, the portable digital device in the alternative embodiment directly requests the print server to transmit the print data from the print server to the selected print station. Lastly, the alternative embodiment further includes a proxy server in conjunction with the access to the Internet, and at least either the print server or the client server is located on the Internet outside of the above described network in the preferred embodiment. The proxy server improves the security in receiving data from the Internet.

Figure 12:
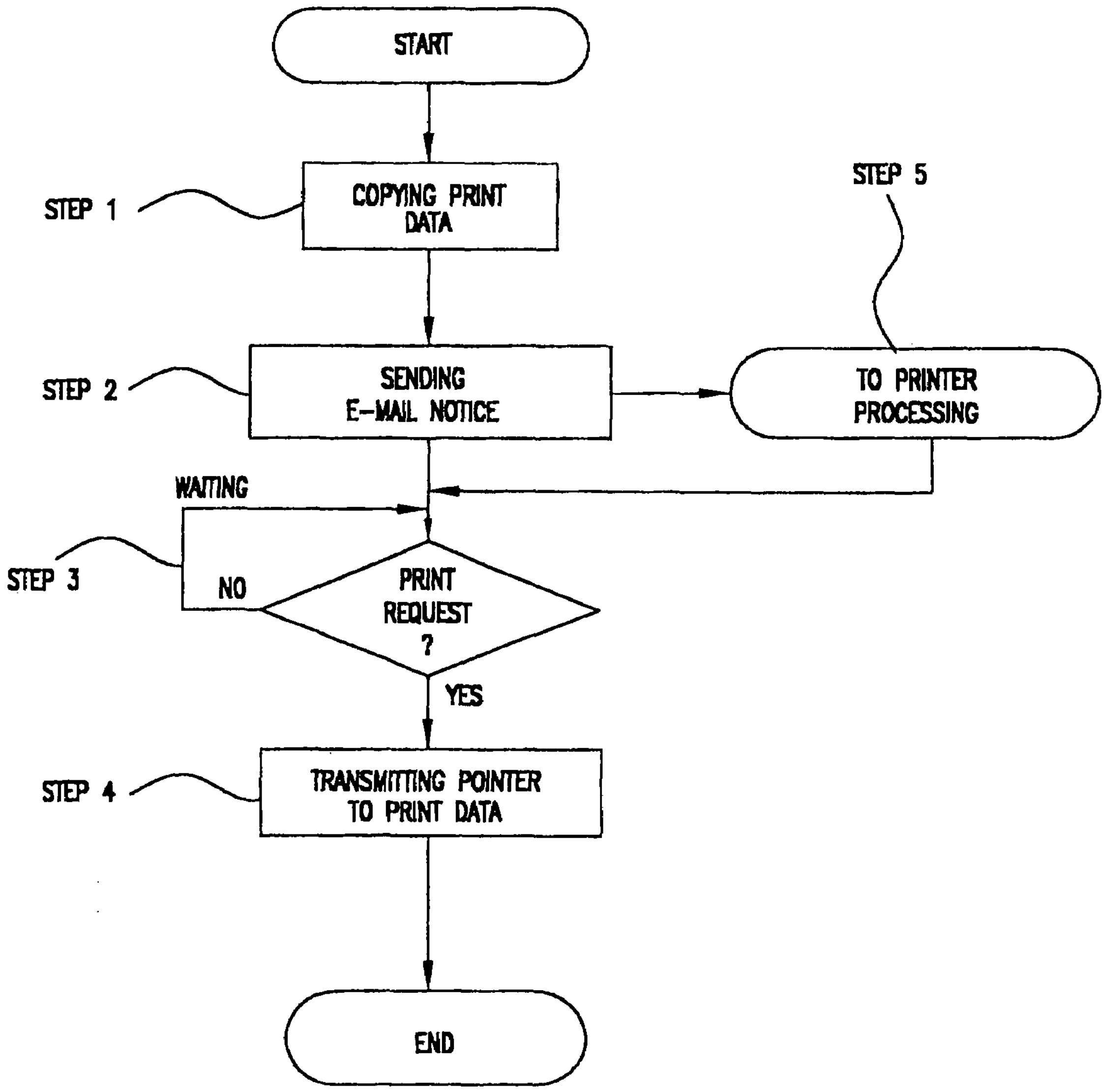
FIG. 12 is a flow chart illustrating acts performed in the print server in a preferred process of remote printing according to the current invention.

Now referring to FIG. 12, a flow chart illustrates acts performed in the print server in a preferred process of remote printing according to the current invention. To describe the acts in the preferred process, although the components of the remote print system are referenced, the reference is strictly exemplary and the acts may be performed by means other than the referenced components. In a step 1, after an author prepares a document in the client 14, the author issues a print command so that the document will be remotely printed and delivered to an intended receiver. The print command causes the document to be temporarily stored in a user area of the print server 13. Although the data format of the document is not limited to a particular form, it is desired that the data format is a widely used format such as PS or PDF formats. In a step 2, the printer server 13 transmits e-mail to the intended receiver via the portable digital device 11, and the e-mail includes the print data pointer and other information such as comments. The transferred information is processed by a portable digital device 11 and print stations 12 as shown in a step 5. The print server 13 then waits for a response or a print request from a print station in a step 3. When there is a print request from a print station, the print server 13 transmits to the print station print data that is specified in the print request in a step 4. The preferred process at the print server terminates after the print data transfer.

Figure 13:
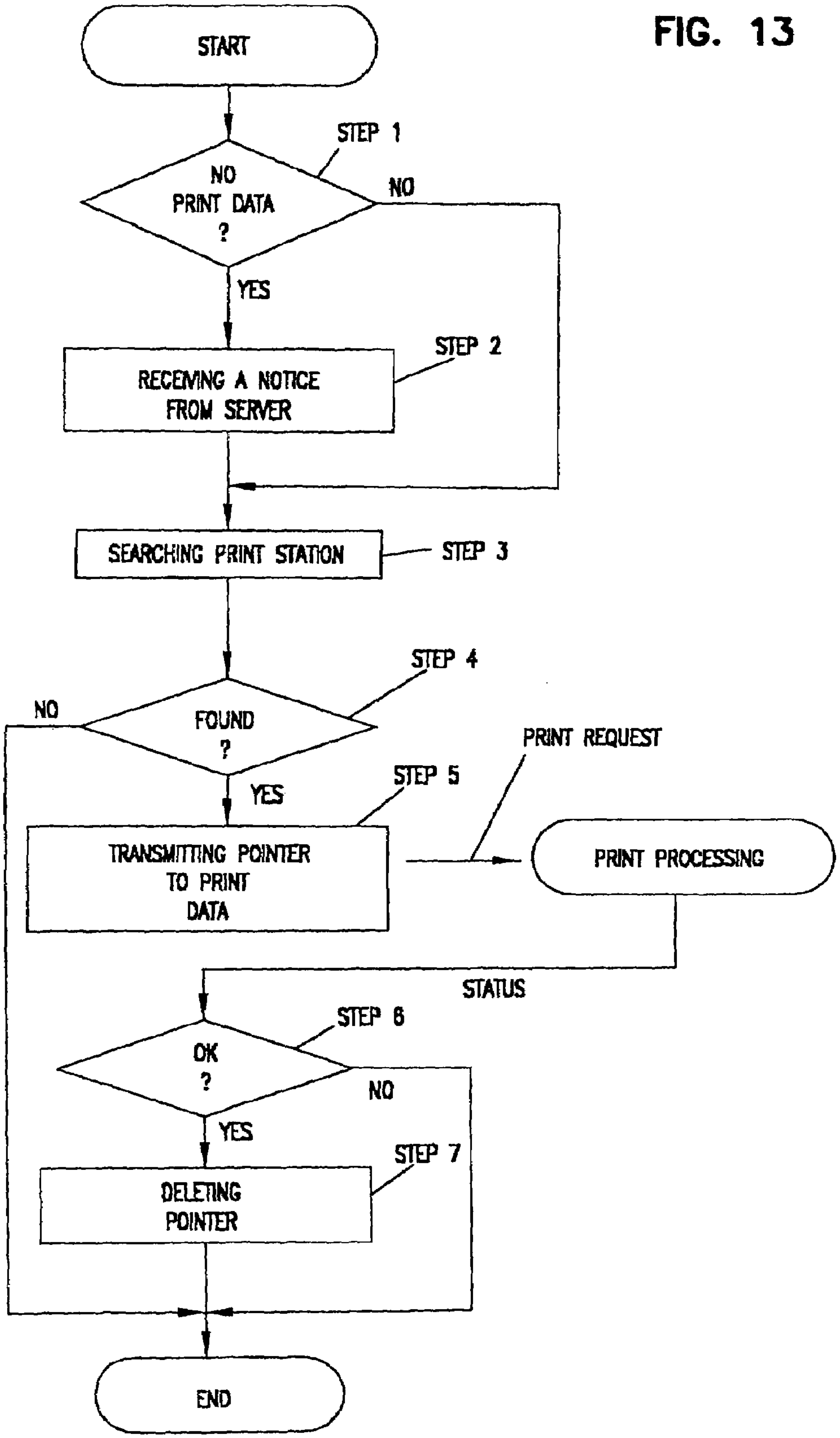
FIG. 13 is a flow chart illustrating acts performed in the portable digital device in a preferred process of remote printing according to the current invention.

Now referring to FIG. 13, a flow chart illustrates acts performed in the portable digital device in a preferred process of remote printing according to the current invention. To describe the acts in the preferred process, although the components of the remote print system are referenced, the reference is strictly exemplary and the acts may be performed by means other than the referenced components. In a step 1, the portable digital device 11 waits for the e-mail print delivery notice. If there is no e-mail print notice, the preferred process terminates. On the other hand, if there is an e-mail print notice, the portable digital device 11 receives the information including a print data pointer in a step 2. In response to the e-mail print notice, the portable digital device now searches an appropriate print station by broadcasting a wireless signal in the vicinity in a step 3. The appropriate print station is determined by a number of criteria including the location of the print station in relation to the portable digital device 11 and the print parameters that are provided in the e-mail print notice. The print parameters include a type of printing such as color, a speed of the printer and a number of copies. When the portable digital device 11 finds no appropriate print station, the preferred process ends after returning a signal indicative of finding no print station to the print server 13. On the other hand, when a desired print station is found, the portable digital device 11 transmits a print request signal to the selected print station in a step 5. The print request signal includes a print data pointer that specifies the address to the print data file that is stored in the print server 13. After the print request, the print station processes the transmitted data, and the portable digital device 11 waits for a return signal from the selected print station in a step 6. If the selected print station returns a print incomplete signal, the preferred process in the portable digital device 11 maintains the e-mail print notice that includes the print data pointer and repeats the steps 5 and 6 on a periodic basis. On the other hand, if the selected print station returns a print complete signal, the preferred process deletes the e-mail print notice from its memory area.

Figure 14:
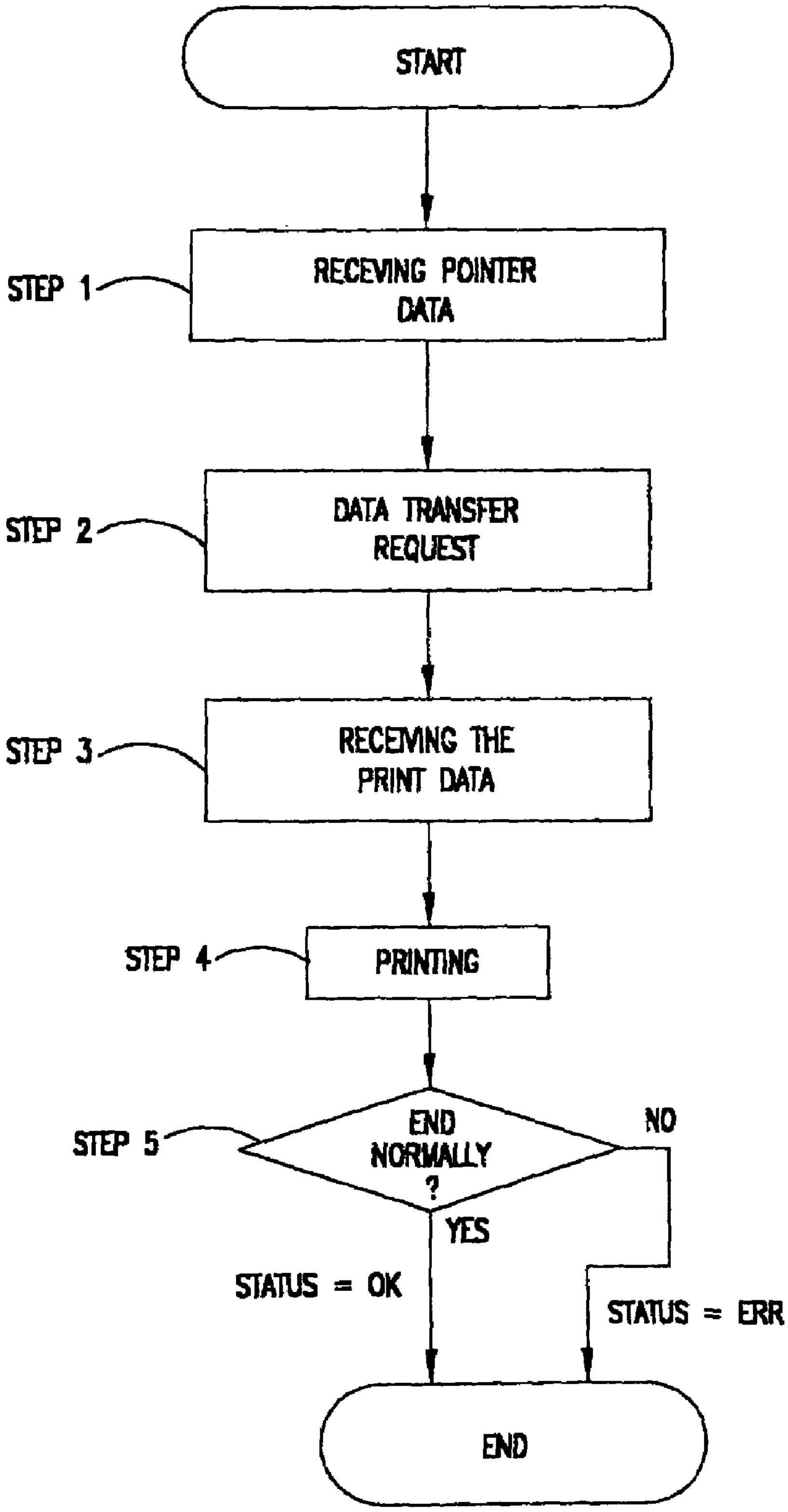
FIG. 14 is a flow chart illustrating acts performed in the print station in a preferred process of remote printing according to the current invention.

Referring to FIG. 14, a flow chart illustrates acts performed in the print station in a preferred process of remote printing according to the current invention. To describe the acts in the preferred process, although the components of the remote print system are referenced, the reference is strictly exemplary and the acts may be performed by means other than the referenced components. In a step 1, the selected print station receives the print data pointer. Based upon the received print data pointer, the print station generates a print data transfer request command and transmits it to the print server 13. The print station receives the requested print data from the print server 13 in a step 3, and the print station prints the received print data in a step 4. Upon completion of the step 4, the print station decides the print status and returns a status code. If the printing step 4 terminates in a normal fashion, the return status code is OK. On the other hand, if the printing step 4 terminates in an abnormal fashion, the return status code is ERR.

Figure 15A:
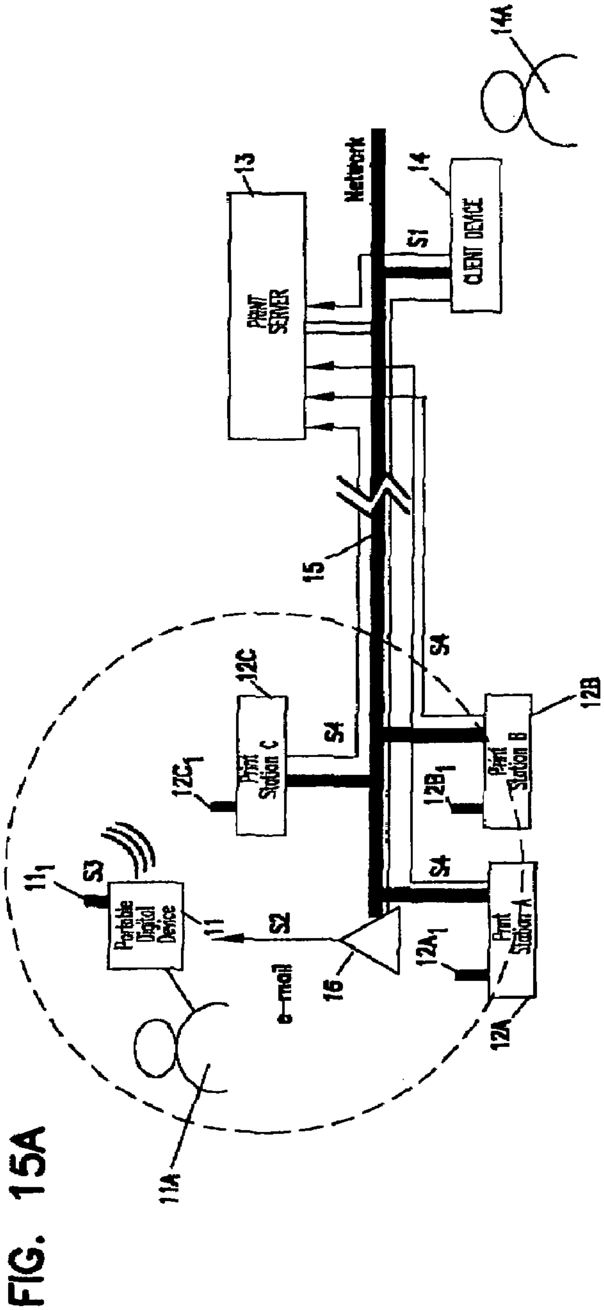
FIGS. 15A and 15B are diagrams illustrating components and their sequential interactions in a second preferred embodiment of the remote printing system according to the current invention.
Figure 15B:
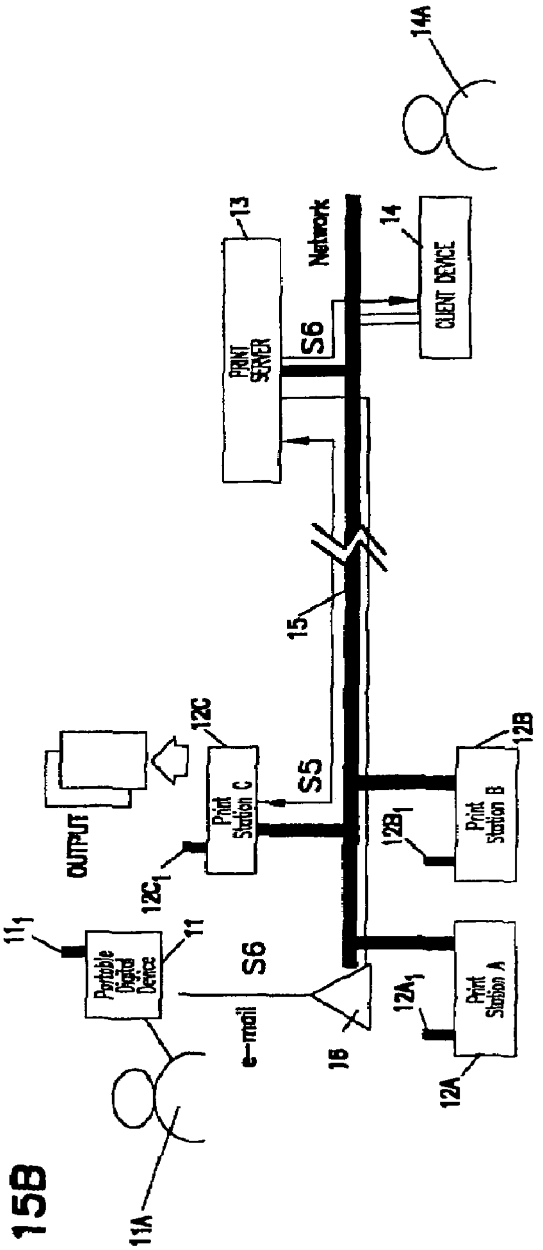

Now referring to FIGS. 15A and 15B, diagrams illustrate components and their sequential interactions in a second preferred embodiment of the remote printing system according to the current invention. The second preferred embodiment includes the substantially identical components as described in the first preferred embodiment as shown in FIGS. 1 through 6 except for the portable digital device 11-1 and the print server 13-1. The remote printing system includes a client device 14, the printer server 13-1, a plurality of print stations 12A, 12B and 12C, an access point or wireless transmitter/receiver 16 as well as the portable digital device 11-1. In general, except for the portable digital device 11-1, all of the above components of the remote printing system are connected physically as well as wirelessly to a cable network 15.

The portable digital devices 11-1 include a cellular phone, a note-size computer and a personal digital assistant (PDA). The portable digital device 11-1 is wirelessly connected to the network 15 via a wireless communication unit 11-1 and the access point 16. The access point 16 is a relay-station between the cable network 15 and a wireless communication device. The print stations 12A, 12B and 12C each have a corresponding wireless communication unit 12$A_1$, 12$B_1$ or 12$C_1$ to wirelessly communicate with the portable digital device 11-1, and the print stations 12A, 12B and 12C also directly communicate with other components via the network 15. Furthermore, the print stations 12A, 12B and 12C are either color or black-and-white printers and may share a common page description language or PDL with the print server 13-1. The print server 13-1 manages print requests or print jobs in a print queue by storing the print requests and sends each of the print jobs to a specified one of the print stations 12A, 12B and 12C. During the course of printing, if any of the print stations 12A, 12B and 12C develops a problem such as a paper jam, the print server 13-1 retransmits the print job to the restored print station. When a print job is completed in a normal fashion, the print server 13-1 releases the corresponding print job from the print queue. The client device 14 includes a personal computer and a workstation.

Referring particularly to FIG. 15A, an author 14*a* prepares a document at the client 14 and issues a print-send command in order to send a hard copy of the document to a carrier of the portable digital device 11-1. As a result of the above described print-send command, the client device 14 sends a copy of the document to the print server 13-1 as shown by an arrow S1. The print server 13-1 temporarily stores the document copy in its user area. The format such as PDL of the print data does not have to be any predetermined format. However, it is preferred that the print data format is a widely used or known format. At the same time, as a result of the print-send command, the client device 14 also transmits an e-mail notice to the portable digital device 11-1 via an access point 16 as indicated by an arrow S2. The e-mail notice includes a print data pointer that refers to an address in the user data storage area in the print server 13-1, a corresponding print job name and a client name. In response to the e-mail print notice, the portable digital device 11-1 transmits a first wireless signal in a predetermined area in search of a print station as indicated by a set of three waves S3 towards the print stations 12A, 12B and 12C. The portable digital device 11-1 in the second preferred embodiment transmits the first wireless signal that reaches each of the print stations 12A, 12B and 12C in a circled area that is wider than that of the first preferred embodiment. The first wireless signal includes information such as the print data pointer that has been sent in the e-mail print notice. Upon receiving the first wireless signal, the print stations 12A, 12B and 12C each send the print server 13-1 information related to their print characteristics via the network 15 as indicated in an arrow S4. The print characteristics include information on the print status that takes a predetermined value of READY or BUSY, the paper size, the printing speed in prints per minute, the color/monochrome value, the resolution value as well as the network address.

Now referring particularly to FIG. 15B, after the above described acts as indicated by the arrows and waves S1 through S4, the second preferred embodiment of the remote printing system further perform the following acts to complete the print-send command. As indicated by the transmission S4 in FIG. 15A, the print server 13-1 receives the print characteristic information from the three print stations 12A, 12B and 12C. Based upon the received print characteristic information, the print server 13-1 selects the most appropriate print station for the pending print-send command. One example of the selection is that if the pending print-send command requires a color hard copy and only one of the responded print stations is capable of printing in color, the print server 13-1 selects the color print station. In this example, the print server 13-1 selects the print station 12C for the pending print-send command and sends via the network 15 the corresponding print data to the selected print station 12C as indicated by the transmission S5. Alternatively, the print server 13-1 simply selects a first responded print station, a first available print station or a print station with the least amount of expected time to complete the print job. In response to the print data transmission S5, the selected print station 12C outputs a hard copy. Simultaneously with or subsequently to the transmission S5, the print server 13-1 also transmits another e-mail as indicated by an arrow S6 to the portable digital device 11-1 via the access point 16 to notify the carrier of the portable digital device 11-1 as to where the hard copy is available and as to when the print has been completed. The print server 13-1 also sends via the network 15 a message containing the same information to the original client device 14 to notify the completion of the print-send command as also indicated by another arrow S6.

An alternative embodiment to the above described remote printing system includes the print stations that each measures the strength of the first wireless signal that was received at the print station from the portable digital device 11-1. The measured strength indicates at least a relative distance between the portable digital device 11-1 and the print stations. The measured signal strength is transmitted to the print server 13-1 as a part of the printer characteristics in the transmission S4. The print server 13-1 in turn selects the most closely located print station based upon the measured signal strength. Even though the Class 3, BlueTooth protocol is used for the first wireless signal transmission, it is often possible to select the closest one of the print stations that are all located within 10 meters from the portable digital device 11-1.

Figures 16A, 16B:
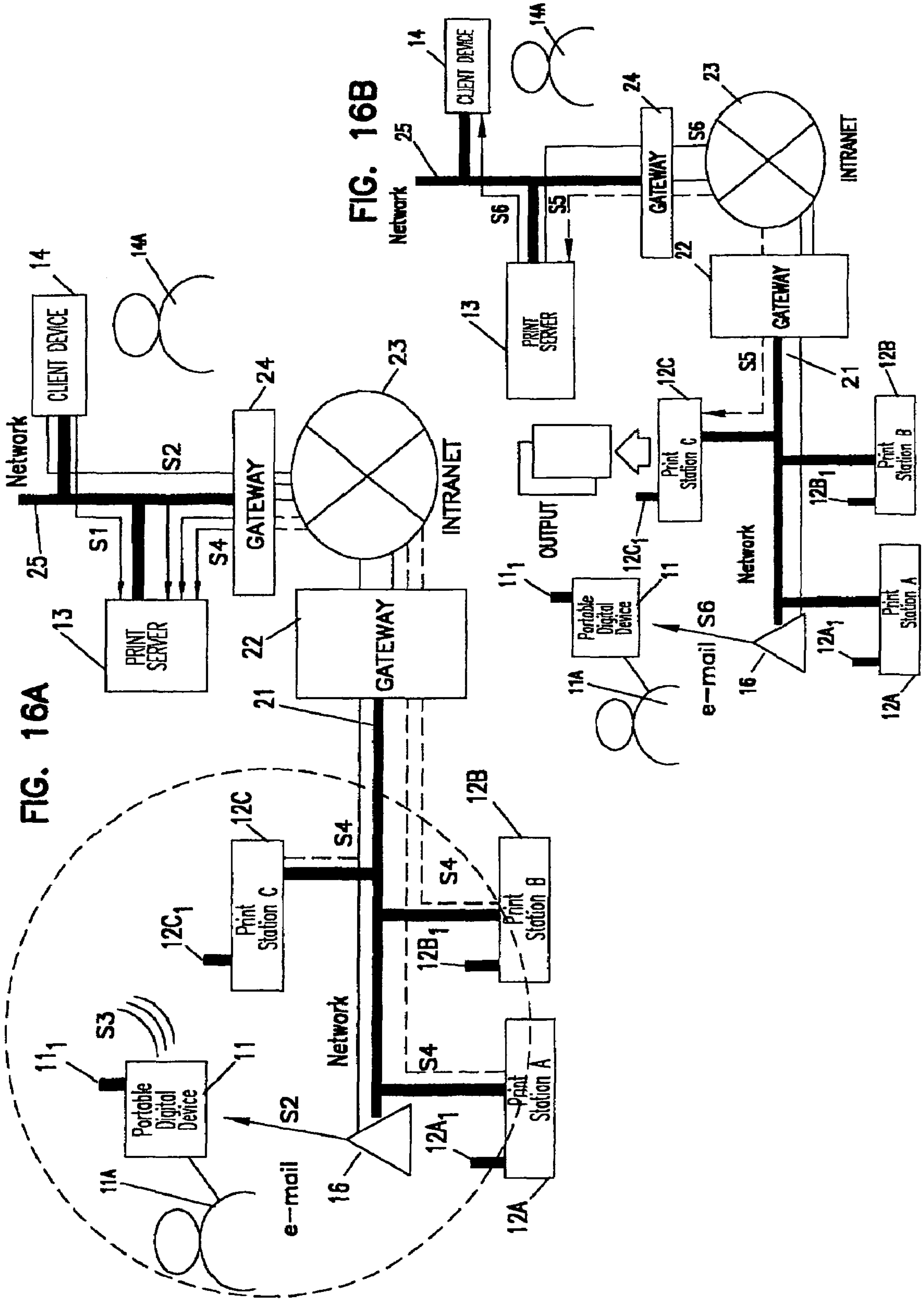
FIGS. 16A and 16B are diagrams illustrating components and their sequential interactions in a third preferred embodiment of the remote printing system according to the current invention.

Now referring to FIGS. 16A and 16B, diagrams illustrate components and their sequential interactions in a third preferred embodiment of the remote printing system according to the current invention. In general, the components of the third preferred embodiment are substantially identical to those referred by the same reference numerals in the previous figures. The third preferred embodiment additionally includes a pair of gateways 22 and 24 as well as an Intranet 23. The networks 21 and 25 connect the components of the third preferred embodiment via the gateways 22, 24 and the Intranet 23. One suitable application of the third preferred embodiment is the remote printing system where the client device 14, the print server 13-1 and the print stations 12A, 12B and 12C are located in separate buildings that are generally in the geographical proximity. In order for the print server 13-1 to send data to one of the print stations 12A, 12B and 12C, the print server transmits via the network 25 the data to the first gateway 24, which is connected to the Intranet 23. The data is routed the second gateway 22 via the Intranet 23 and is further transmitted to an intended print station via the network 21.

Referring particularly to FIG. 16A, an author 14*a* prepares a document at the client 14 and issues a print-send command in order to send a hard copy of the document to a carrier of the portable digital device 11-1. As a result of the above described print-send command, the client device 14 sends a copy of the document to the print server 13-1 as shown by a solid line S1 within the network 25. The print server 13-1 temporarily stores the document copy in its user area. The format such as PDL of the print data does not have to be any predetermined format. However, it is preferred that the print data format is a widely used or known format. At the same time, as a result of the print-send command, the client device 14 also transmits through the networks 21 and 25 an e-mail notice to the portable digital device 11-1 via the gateway 24, the Intranet 23, the gateway 22 and an access point 16 as indicated by an arrow S2. The e-mail notice includes a print data pointer that refers to an address in the user data storage area in the print server 13-1, a corresponding print job name and a client name. In response to the e-mail print notice, the portable digital device 11-1 transmits a first wireless signal in a predetermined area in search of a print station as indicated by a set of three waves S3 towards the print stations 12A, 12B and 12C. The portable digital device 11-1 in the third preferred embodiment transmits the first wireless signal that reaches each of the print stations 12A, 12B and 12C in a circled area that is wider than that of the first preferred embodiment. The first wireless signal includes information such as the print data pointer that was sent in the e-mail print notice. Upon receiving the first wireless signal, the print stations 12A, 12B and 12C each send through the networks 21 and 25 the print server 13-1 information related to their print characteristics as indicated in an arrow S4 via the gateway 22, the Intranet 23 and the gateway 24. The print characteristics include information on the print status that takes a predetermined value of READY or BUSY, the paper size, the printing speed in prints per minute, the color/monochrome value, the resolution value as well as the network address.

Now referring particularly to FIG. 16B, after the above described acts as indicated by the arrows and waves S1 through S4, the third preferred embodiment of the remote printing system further perform the following acts to complete the print-send command. As indicated by the transmission S4 in FIG. 16A, the print server 13-1 receives the print characteristic information from the three print stations 12A, 12B and 12C. Based upon the received print characteristic information, the print server 13-1 selects the most appropriate print station for the pending print-send command. One example of the selection is that if the pending print-send command requires a color hard copy and only one of the responded print stations is capable of printing in color, the print server 13-1 selects the color print station. In this example, the print server 13-1 selects the print station 12C for the pending print-send command and sends through the networks 21 and 25 the corresponding print data to the selected print station 12C via the gateway 22, the Intranet 23 and the gateway 24 as indicated by the transmission S5. Alternatively, the print server 13-1 simply selects a first responded print station, a first available print station or a print station with the least amount of expected time to complete the print job. In response to the print data transmission S5, the selected print station 12C outputs a hard copy. Simultaneously with or subsequently to the transmission S5, the print server 13-1 also transmits another e-mail as indicated by an arrow S6 to the portable digital device 11-1 via the gateway 24, the Intranet 23, the gateway 22 and the access point 16 to notify the carrier of the portable digital device 11-1 as to where the hard copy is available and as to when the print has been completed. The print server 13-1 also sends via the network 25 a message containing the same information to the original client device 14 to notify the completion of the print-send command as also indicated by another arrow S6.

Figures 17A, 17B:
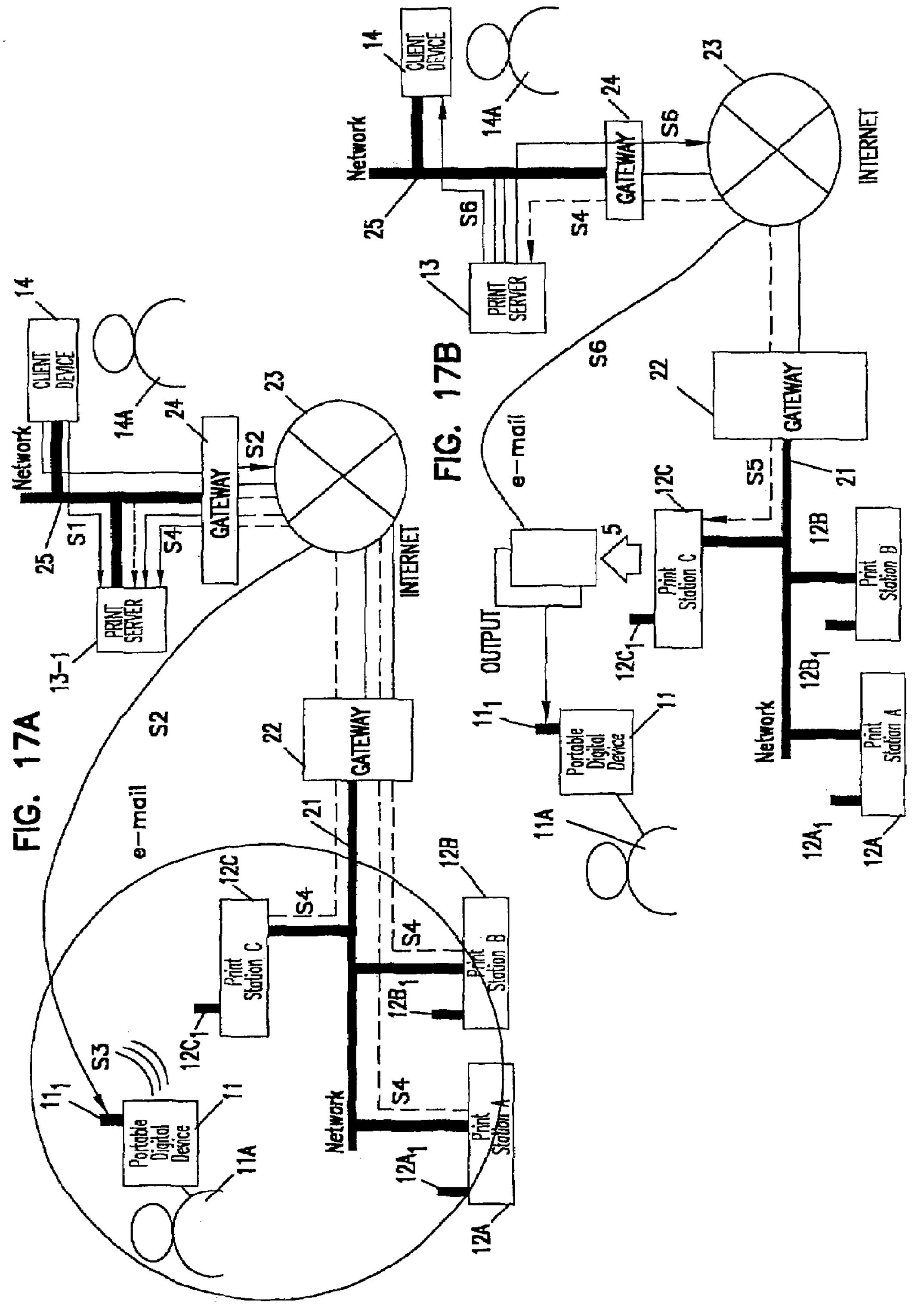
FIGS. 17A and 17B are diagrams illustrating components and their sequential interactions in a fourth preferred embodiment of the remote print system according to the current invention.

Now referring to FIGS. 17A and 17B, diagrams illustrate components and their sequential interactions in a fourth preferred embodiment of the remote print system according to the current invention. In general, the components of the fourth preferred embodiment are substantially identical to those referred by the same reference numerals in the previous figures. The fourth preferred embodiment additionally includes a pair of gateways 22 and 24 as well as an Internet 26. The networks 21 and 25 connect the components of the fourth preferred embodiment via the gateways 22, 24 and the Internet 23. One suitable application of the fourth preferred embodiment is the remote printing system where the client device 14, the print server 13-1 and the print stations 12A, 12B and 12C are located in separate locations that are not necessarily in the geographical proximity. In order for the print server 13-1 to send data or e-mail to one of the print stations 12A, 12B and 12C, the print server transmits via the network 25 the data to the first gateway 24, which is connected to the Internet 26. The data is routed the second gateway 22 via the Internet 26 and is further transmitted to an intended print station via the network 21. In general, the data or the e-mail is delivered through an e-mail service provider.

Referring particularly to FIG. 17A, an author 14*a* prepares a document at the client 14 and issues a print-send command in order to send a hard copy of the document to a carrier of the portable digital device 11-1. As a result of the above described print-send command, the client device 14 sends a copy of the document to the print server 13-1 as shown by a solid line S1 within the network 25. The print server 13-1 temporarily stores the document copy in its user area. The format such as PDL of the print data does not have to be any predetermined format. However, it is preferred that the print data format is a widely used or known format. At the same time, as a result of the print-send command, the client device 14 also transmits through the network 25 an e-mail notice to the portable digital device 11-1 via the gateway 24 and the Internet 26 as indicated by an arrow S2. The e-mail notice includes a print data pointer that refers to an address in the user data storage area in the print server 13-1, a corresponding print job name and a client name. In response to the e-mail print notice, the portable digital device 11-1 transmits a first wireless signal in a predetermined area in search of a print station as indicated by a set of three waves S3 towards the print stations 12A, 12B and 12C. The portable digital device 11-1 in the fourth preferred embodiment transmits the first wireless signal that reaches each of the print stations 12A, 12B and 12C in a circled area that is wider than that of the first preferred embodiment. The first wireless signal includes information such as the print data pointer that was sent in the e-mail print notice. Upon receiving the first wireless signal, the print stations 12A, 12B and 12C each send through the networks 21 and 25 the print server 13-1 information related to their print characteristics as indicated in an arrow S4 via the gateway 22, the Internet 26 and the gateway 24. The print characteristics include information on the print status that takes a predetermined value of READY or BUSY, the paper size, the printing speed in prints per minute, the color/monochrome value, the resolution value as well as the network address.

Now referring particularly to FIG. 17B, after the above described acts as indicated by the arrows and waves S1 through S4, the fourth preferred embodiment of the remote printing system further perform the following acts to complete the print-send command. As indicated by the transmission S4 in FIG. 17A, the print server 13-1 receives the print characteristic information from the three print stations 12A, 12B and 12C. Based upon the received print characteristic information, the print server 13-1 selects the most appropriate print station for the pending print-send command. One example of the selection is that if the pending print-send command requires a color hard copy and only one of the responded print stations is capable of printing in color, the print server 13-1 selects the color print station. In this example, the print server 13-1 selects the print station 12C for the pending print-send command and sends through the networks 25 and 21 the corresponding print data to the selected print station 12C via the gateway 24, the Internet 26 and the gateway 22 as indicated by the transmission S5. Alternatively, the print server 13-1 simply selects a first responded print station, a first available print station or a print station with the least amount of expected time to complete the print job. In response to the print data transmission S5, the selected print station 12C outputs a hard copy. Simultaneously with or subsequently to the transmission S5, the print server 13-1 also transmits another e-mail as indicated by an arrow S6 to the portable digital device 11-1 via the gateway 24 and the Internet 26 to notify the carrier of the portable digital device 11 as to where the hard copy is available and as to when the print has been completed. The print server 13-1 also sends via the network 25 a message containing the same information to the original client device 14 to notify the completion of the print-send command as also indicated by another arrow S6.

Figure 18:
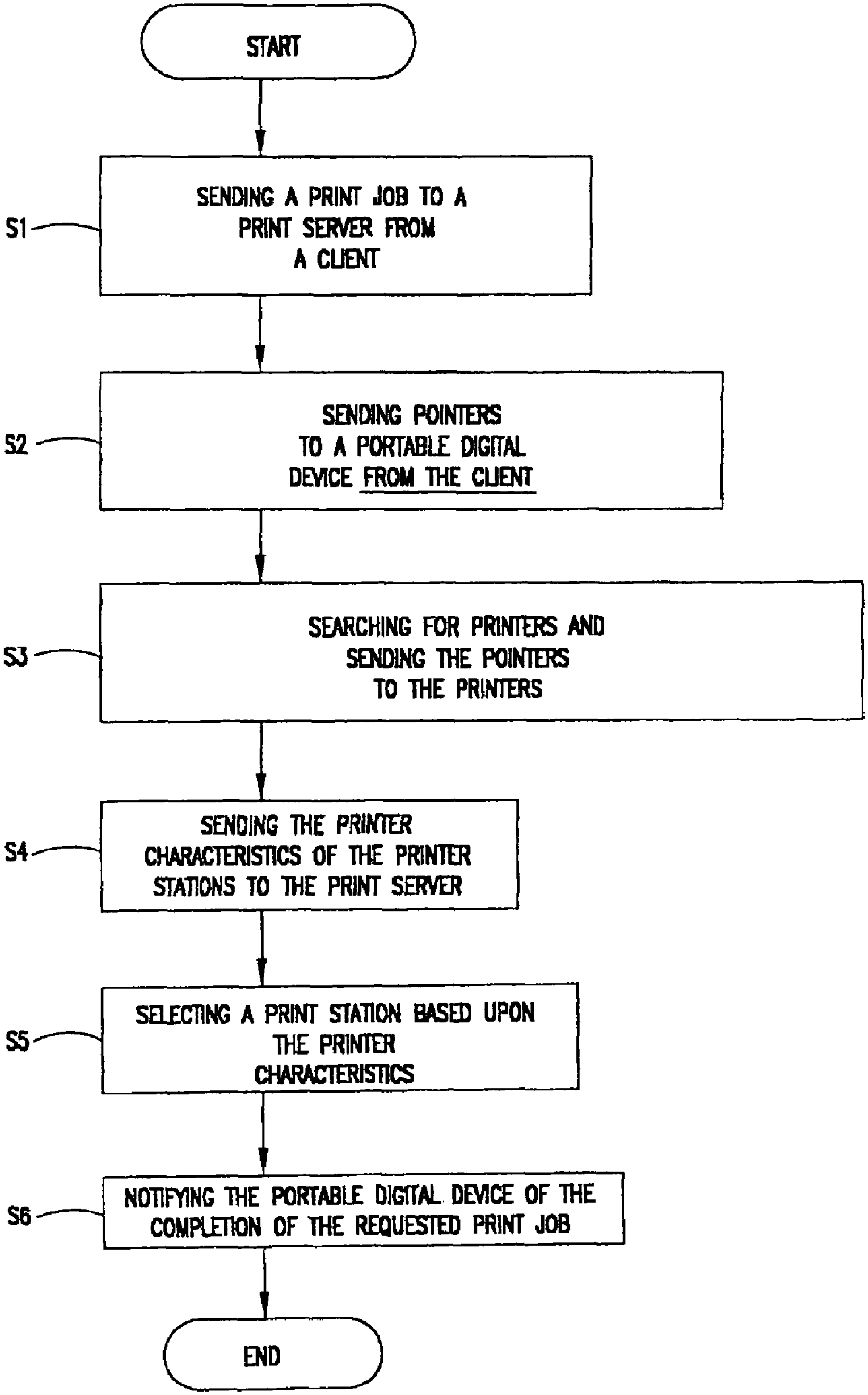
FIG. 18 is a flow chart illustrating common acts performed by the above described second, third and fourth preferred embodiments of the remote printing system according to the current invention.

Now referring to FIG. 18, a flow chart illustrates common acts performed by the above described second, third and fourth preferred embodiments of the remote printing system according to the current invention. To describe the acts in the preferred process, although the components of the remote print system are referenced, the reference is strictly exemplary and the acts may be performed by means other than the referenced components. In a step 1, after an author prepares a document in the client 14, the author issues a print-send command so that the document will be remotely printed and delivered to an intended receiver. The print-send command causes the document to be temporarily stored in a user area of the print server 13. Although the data format of the document is not limited to a particular form, it is desired that the data format is a widely used format such as PS or PDF formats. In a step 2, the client device 14 transmits e-mail to the intended receiver via the portable digital device 11, and the e-mail includes the print data pointer and other information such as comments. In response to the e-mail print notice, the portable digital device 11 now searches an appropriate print station by broadcasting a wireless signal in the vicinity in a step 3. The wireless signal includes information on the print server 13 that has been sent in the e-mail print notice. In a step 4, in response to the wireless signal, the print stations each send their print characteristics to the print server 13. Based upon the reply information on the printer characteristics and others, the print server 13 now selects an appropriate print station in a step 5. The selection criteria include a number of factors including the location of the print station in relation to the portable digital device 11 and the print parameters that are provided in the e-mail print notice. The print parameters include a type of printing such as color, a speed of the printer and a number of copies. The print server 13 transmits the print data to the selected print station in the step 5. Finally, upon completion of the print-send command, the print server 13 sends another e-mail to the portable digital device 11 to notify that the previously issued print-send command has been completed in a step 6. Then the preferred then process terminates.

Figure 19A:
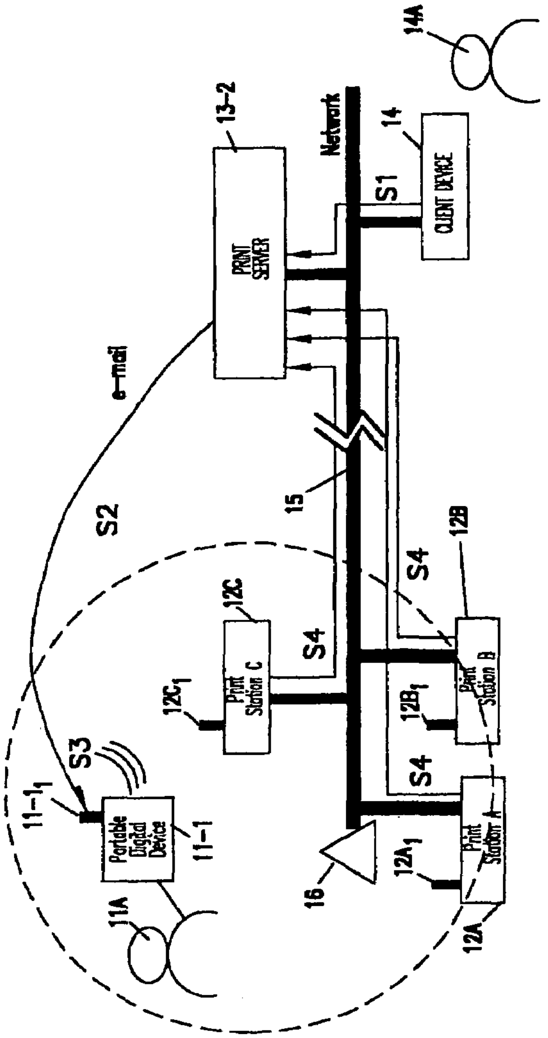
FIGS. 19A and 19B are diagrams illustrating components and their sequential interactions in a fifth preferred embodiment of the remote printing system according to the current invention.
Figure 19B:
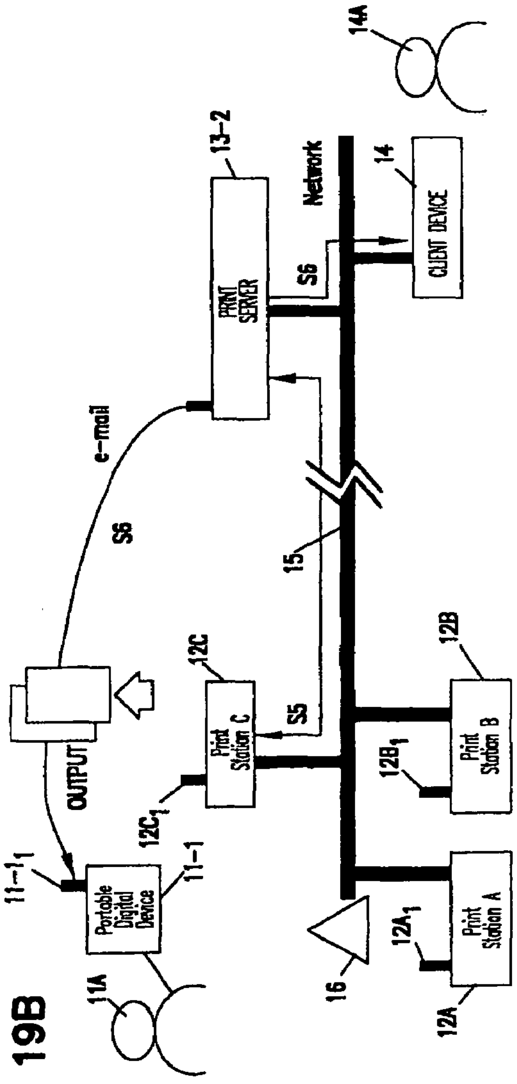

Now referring to FIGS. 19A and 19B, diagrams illustrate components and their sequential interactions in a fifth preferred embodiment of the remote printing system according to the current invention. The fifth preferred embodiment includes the substantially identical components as described in the first preferred embodiment as shown in FIGS. 1 through 6 except for the portable digital device 11-1 and the print server 13-2. The remote printing system includes a client device 14, the printer server 13-2, a plurality of print stations 12A, 12B and 12C, an access point or wireless transmitter/receiver 16 as well as the portable digital device 11-1. In general, except for the portable digital device 11-1, all of the above components of the remote printing system are connected physically as well as wirelessly to a cable network 15. The portable digital devices 11-1 include a cellular phone, a note-size computer and a personal digital assistant (PDA). The portable digital device 11-1 is wirelessly connected to the network 15 via a wireless communication unit 11-1 and the access point 16. The access point 16 is a relay-station between the cable network 15 and a wireless communication device. The print stations 12A, 12B and 12C each have a corresponding wireless communication unit 12$A_1$, 12$B_1$ or 12$C_1$ to wirelessly communicate with the portable digital device 11-1, and the print stations 12A, 12B and 12C also directly communicate with other components via the network 15. Furthermore, the print stations 12A, 12B and 12C are either color or black-and-white printers and may share a common page description language or PDL with the print server 13-2. The print server 13-2 also has a wireless communication unit 13-2$_1$ to wirelessly communicate with the portable digital device 11-1 as well as the print stations 12A, 12B and 12C. The print server 13-2 manages print requests or print jobs in a print queue by storing the print requests and sends each of the print jobs to a specified one of the print stations 12A, 12B and 12C. During the course of printing, if any of the print stations 12A, 12B and 12C develops a problem such as a paper jam, the print server 13-2 retransmits the print job to the restored print station. When a print job is completed in a normal fashion, the print server 13-2 releases the corresponding print job from the print queue. The client device 14 includes a personal computer and a workstation.

Referring particularly to FIG. 19A, an author 14*a* prepares a document at the client device 14 and issues a print-send command in order to send a hard copy of the document to a carrier 11a of the portable digital device 11-1. As a result of the above described print-send command, the client device 14 sends a copy of the document to the print server 13-2 as shown by an arrow S1. The print server 13-2 temporarily stores the document copy in its user area. The format such as PDL of the print data does not have to be any predetermined format. However, it is preferred that the print data format is a widely used or known format. At the same time, as a result of the print-send command, the print server 13-2 also wirelessly transmits an e-mail notice directly to the portable digital device 11-1 via the communication unit 13-2$_1$ as indicated by an arrow S2. The e-mail notice includes a print data pointer that refers to an address in the user data storage area in the print server 13-2, a corresponding print job name and a client name. In response to the e-mail print notice, the portable digital device 11-1 transmits a first wireless signal in a predetermined area in search of a print station as indicated by a set of three waves S3 towards the print stations 12A, 12B and 12C. The portable digital device 11-1 in the fifth preferred embodiment transmits the first wireless signal that reaches each of the print stations 12A, 12B and 12C in a circled area that is wider than that of the first preferred embodiment. The first wireless signal includes information such as the print data pointer that has been sent in the e-mail print notice. Upon receiving the first wireless signal, the print stations 12A, 12B and 12C each send the print server 13-2 information related to their print characteristics as indicated in an arrow S4 via the network 15. The print characteristics include information on the print status that takes a predetermined value of READY or BUSY, the paper size, the printing speed in prints per minute, the color/monochrome value, the resolution value as well as the network address.

Now referring particularly to FIG. 19B, after the above described acts as indicated by the arrows and waves S1 through S4, the fifth preferred embodiment of the remote printing system further perform the following acts to complete the print-send command. As indicated by the transmission S4 in FIG. 19A, the print server 13-2 receives the print characteristic information from the three print stations 12A, 12B and 12C. Based upon the received print characteristic information, the print server 13-2 selects the most appropriate print station for the pending print-send command. One example of the selection is that if the pending print-send command requires a color hard copy and only one of the responded print stations is capable of printing in color, the print server 13-2 selects the color print station. In this example, the print server 13-2 selects the print station 12C for the pending print-send command and sends via the network 15 the corresponding print data to the selected print station 12C as indicated by the transmission S5. Alternatively, the print server 13-2 simply selects a first responded print station, a first available print station or a print station with the least amount of expected time to complete the print job. In response to the print data transmission S5, the selected print station 12C outputs a hard copy. Simultaneously with or subsequently to the transmission S5, the print server 13-2 also transmits via the communication unit 13-2$_1$ another e-mail as indicated by an arrow S6 directly to the portable digital device 11-1 to notify the carrier 11*a* of the portable digital device 11-1 as to where the hard copy is available and as to when the print has been completed. The print server 13-2 also sends via the network 15 a message containing the same information to the original client device 14 to notify the completion of the print-send command as also indicated by another arrow S6.

Figure 20A:
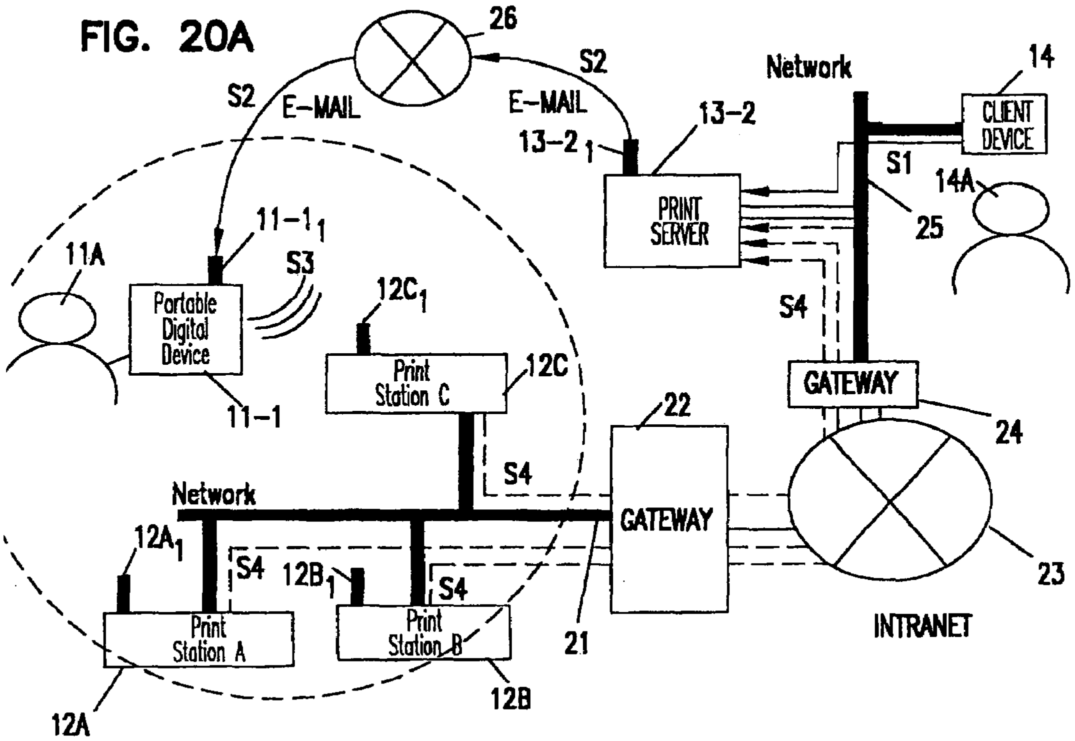
FIGS. 20A and 20B are diagrams illustrating components and their sequential interactions in a sixth preferred embodiment of the remote printing system according to the current invention.
Figure 20B:
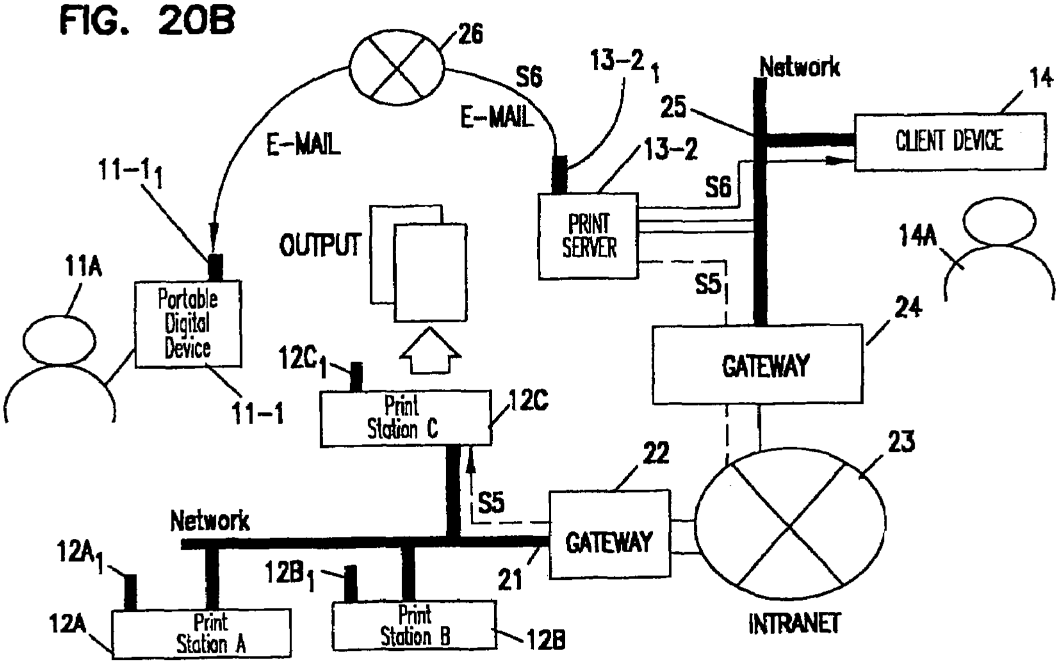

Now referring to FIGS. 20A and 20B, diagrams illustrate components and their sequential interactions in a sixth preferred embodiment of the remote printing system according to the current invention. In general, the components of the sixth preferred embodiment are substantially identical to those referred by the same reference numerals in the previous figures. The sixth preferred embodiment additionally includes a pair of gateways 22 and 24, the Internet 26 as well as an Intranet 23. The networks 21 and 25 connect the components of the sixth preferred embodiment via the gateways 22, 24, the Internet and the Intranet 23. One suitable application of the sixth preferred embodiment is the remote printing system where the client device 14, the print server 13-2 and the print stations 12A, 12B and 12C are located in separate buildings that are generally in the geographical proximity. In order for the print server 13-2 to send data to one of the print stations 12A, 12B and 12C, the print server 13-2 transmits via the network 25 the data to the first gateway 24, which is connected to the Intranet 23. The data is routed the second gateway 22 via the Intranet 23 and is further transmitted to an intended print station via the network 21. On the other hand, in order for the print server 13-2 to send data to the portable digital device 11-1, the communication unit 13-2$_1$ transmits the data via the Internet 26.

Referring particularly to FIG. 20A, an author 14*a* prepares a document at the client device 14 and issues a print-send command in order to send a hard copy of the document to a carrier 11*a* of the portable digital device 11-1. As a result of the above described print-send command, the client device 14 sends a copy of the document to the print server 13-2 as shown by a solid line S1 within the network 25. The print server 13-2 temporarily stores the document copy in its user area. The format such as PDL of the print data does not have to be any predetermined format. However, it is preferred that the print data format is a widely used or known format. At the same time, as a result of the print-send command, the print server 13-2 also transmits through the Internet 26 an e-mail notice to the portable digital device 11-1 via the communication units 13-2$_1$ and 11-1$_1$ as indicated by an arrow S2. The e-mail notice includes a print data pointer that refers to an address in the user data storage area in the print server 13-2, a corresponding print job name and a client name. In response to the e-mail print notice, the portable digital device 11-1 transmits a first wireless signal in a predetermined area in search of a print station as indicated by a set of three waves S3 towards the print stations 12A, 12B and 12C. The portable digital device 11-1 in the sixth preferred embodiment transmits the first wireless signal that reaches each of the print stations 12A, 12B and 12C in a circled area that is wider than that of the first preferred embodiment. The first wireless signal includes information such as the print data pointer that has been sent in the e-mail print notice. Upon receiving the first wireless signal, the print stations 12A, 12B and 12C each send through the networks 21 and 25 the print server 13-2 information related to their print characteristics as indicated in an arrow S4 via the gateway 22, the Intranet 23 and the gateway 24. The print characteristics include information on the print status that takes a predetermined value of READY or BUSY, the paper size, the printing speed in prints per minute, the color/monochrome value, the resolution value as well as the network address.

Now referring particularly to FIG. 20B, after the above described acts as indicated by the arrows and waves S1 through S4, the sixth preferred embodiment of the remote printing system further perform the following acts to complete the print-send command. As indicated by the transmission S4 in FIG. 20A, the print server 13-2 receives the print characteristic information from the three print stations 12A, 12B and 12C. Based upon the received print characteristic information, the print server 13-2 selects the most appropriate print station for the pending print-send command. One example of the selection is that if the pending print-send command requires a color hard copy and only one of the responded print stations is capable of printing in color, the print server 13-2 selects the color print station. In this example, the print server 13-2 selects the print station 12C for the pending print-send command and sends through the networks 21 and 25 the corresponding print data to the selected print station 12C via the gateway 24, the Intranet 23 and the gateway 22 as indicated by the transmission S5. Alternatively, the print server 13-2 simply selects a first responded print station, a first available print station or a print station with the least amount of expected time to complete the print job. In response to the print data transmission S5, the selected print station 12C outputs a hard copy. Simultaneously with or subsequently to the transmission S5, the print server 13-2 also transmits another e-mail as indicated by an arrow S6 to the portable digital device 11-1 via the communication units 13-2$_1$, 11-1$_1$ and the Internet 26 to notify the carrier 11*a* as to where the hard copy is available and as to when the print has been completed. The print server 13-2 also sends a message containing the same information to the original client device 14 to notify the completion of the print-send command as also indicated by another arrow S6 via the network 25.

Figure 21A:
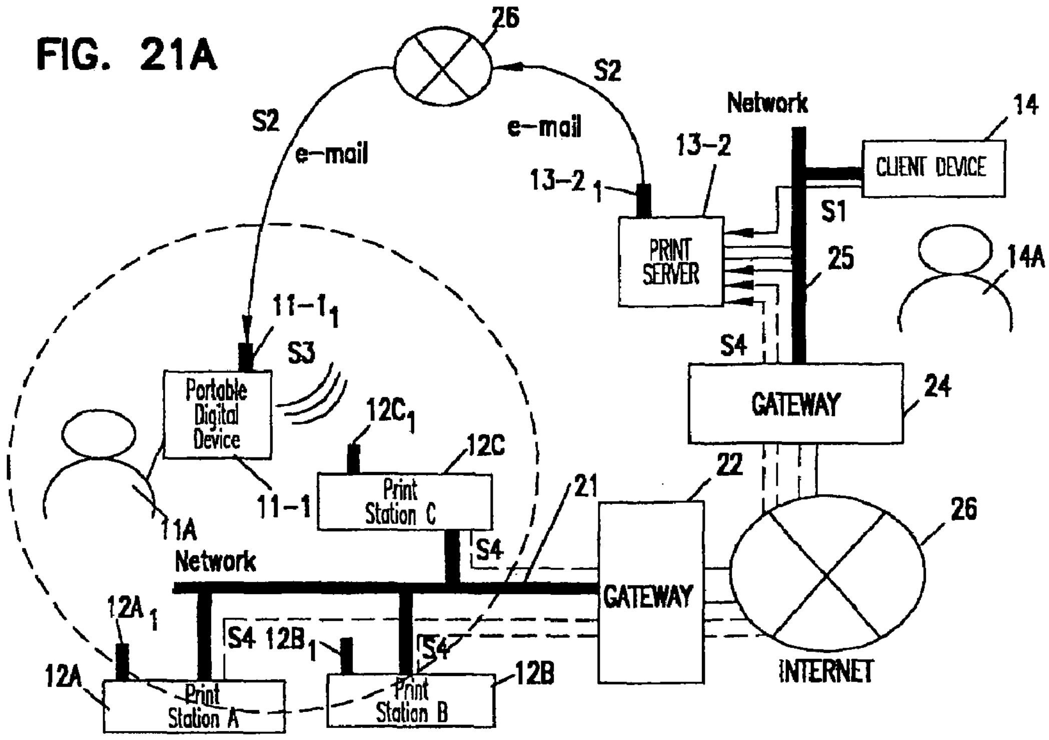
FIGS. 21A and 21B are diagrams illustrating components and their sequential interactions in a seventh preferred embodiment of the remote printing system according to the current invention.
Figure 21B:
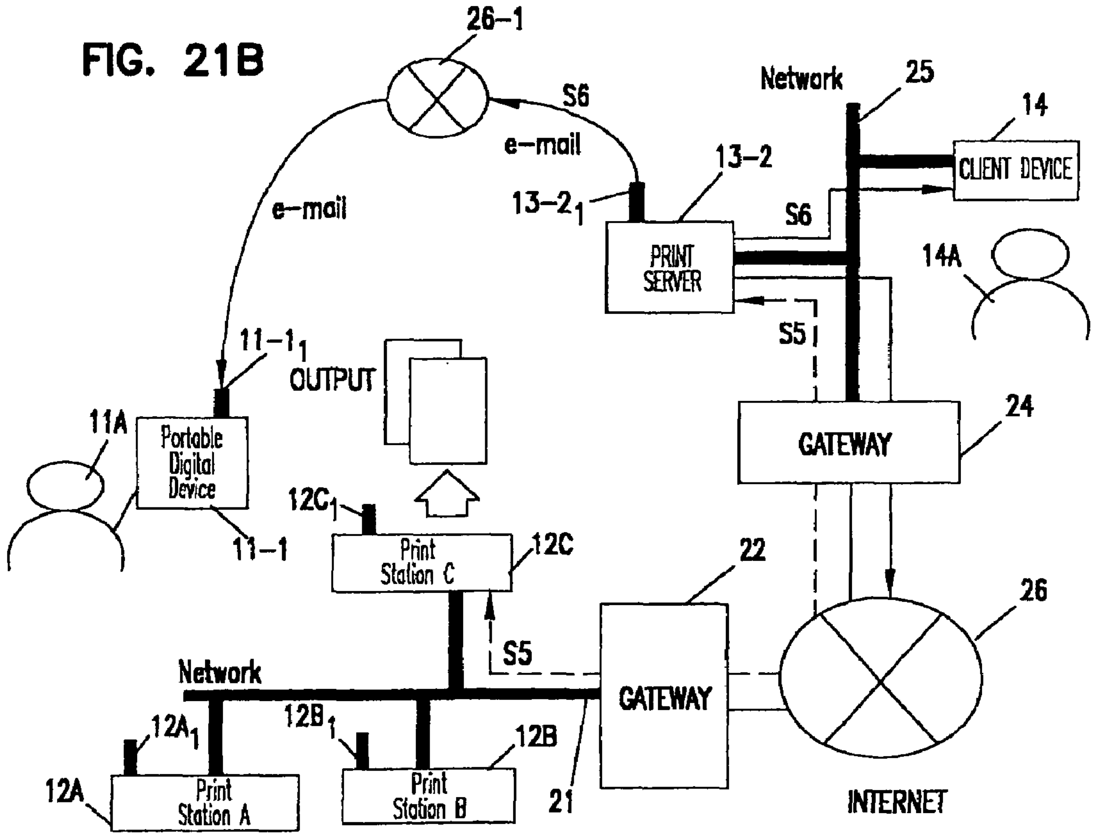

Now referring to FIGS. 21A and 21B, diagrams illustrate components and their sequential interactions in a seventh preferred embodiment of the remote printing system according to the current invention. In general, the components of the seventh preferred embodiment are substantially identical to those referred by the same reference numerals in the previous figures. The seventh preferred embodiment additionally includes a pair of gateways 22 and 24, a public network 26-1 as well as the Internet 26. The networks 21 and 25 connect the components of the seventh preferred embodiment via the gateways 22, 24 and the Internet 23. One suitable application of the seventh preferred embodiment is the remote printing system where the client device 14, the print server 13-2 and the print stations 12A, 12B and 12C are located in separate locations that are not necessarily in the geographical proximity. In order for the print server 13-2 to send data or e-mail to one of the print stations 12A, 12B and 12C, the print server transmits via the network 25 the data to the first gateway 24, which is connected to the Internet 26. The data is routed the second gateway 22 via the Internet 26 and is further transmitted to an intended print station via the network 21. In general, the data or the e-mail is delivered through an e-mail service provider. The print server is also equipped with the communication unit $\mathbf{13\text{-}2_1}$ to communicate with the portable digital device 11-1 via the public wireless network 26-1.

Referring particularly to FIG. 21A, an author 14*a* prepares a document at the client 14 and issues a print-send command in order to send a hard copy of the document to a carrier 11*a* of the portable digital device 11-1. As a result of the above described print-send command, the client device 14 sends a copy of the document to the print server 13-2 as shown by a solid line S1 within the network 25. The print server 13-2 temporarily stores the document copy in its user area. The format such as PDL of the print data does not have to be any predetermined format. However, it is preferred that the print data format is a widely used or known format. At the same time, as a result of the print-send command, the print server 13-2 wirelessly transmits via the public network 26-1 an e-mail notice to the portable digital device 11-1 via the communication unit $\mathbf{13\text{-}2_1}$ as indicated by an arrow S2. The e-mail notice includes a print data pointer that refers to an address in the user data storage area in the print server 13-2, a corresponding print job name and a client name. In response to the e-mail print notice, the portable digital device 11-1 transmits a first wireless signal in a predetermined area in search of a print station as indicated by a set of three waves S3 towards the print stations 12A, 12B and 12C. The portable digital device 11-1 in the seventh preferred embodiment transmits the first wireless signal that reaches each of the print stations 12A, 12B and 12C in a circled area that is wider than that of the first preferred embodiment. The first wireless signal includes information such as the print data pointer that has been sent in the e-mail print notice. Upon receiving the first wireless signal, the print stations 12A, 12B and 12C each send through the networks 21 and 25 the print server 13-2 information related to their print characteristics as indicated in an arrow S4 via the gateway 22, the Internet 26 and the gateway 24. The print characteristics include information on the print status that takes a predetermined value of READY or BUSY, the paper size, the printing speed in prints per minute, the color/monochrome value, the resolution value as well as the network address.

Now referring particularly to FIG. 21B, after the above described acts as indicated by the arrows and waves S1 through S4, the seventh preferred embodiment of the remote printing system further perform the following acts to complete the print-send command. As indicated by the transmission S4 in FIG. 21A, the print server 13-2 receives the print characteristic information from the three print stations 12A, 12B and 12C. Based upon the received print characteristic information, the print server 13-2 selects the most appropriate print station for the pending print-send command. One example of the selection is that if the pending print-send command requires a color hard copy and only one of the responded print stations is capable of printing in color, the print server 13-2 selects the color print station. In this example, the print server 13-2 selects the print station 12C for the pending print-send command and sends through the networks 25 and 21 the corresponding print data to the selected print station 12C via the gateway 24, the Internet 26 and the gateway 22 as indicated by the transmission S5. Alternatively, the print server 13-2 simply selects a first responded print station, a first available print station or a print station with the least amount of expected time to complete the print job. In response to the print data transmission S5, the selected print station 12C outputs a hard copy. Simultaneously with or subsequently to the transmission S5, the print server 13-2 also transmits another e-mail as indicated by an arrow S6 to the portable digital device 11-1 via the communication unit $\mathbf{13\text{-}2_1}$ and the public network 26-1 to notify the carrier 11*a* of the portable digital device 11-1 as to where the hard copy is available and as to when the print has been completed. The print server 13-2 also sends a message containing the same information to the original client device 14 to notify the completion of the print-send command as also indicated by another arrow S6 via the network 25.

Figure 22:
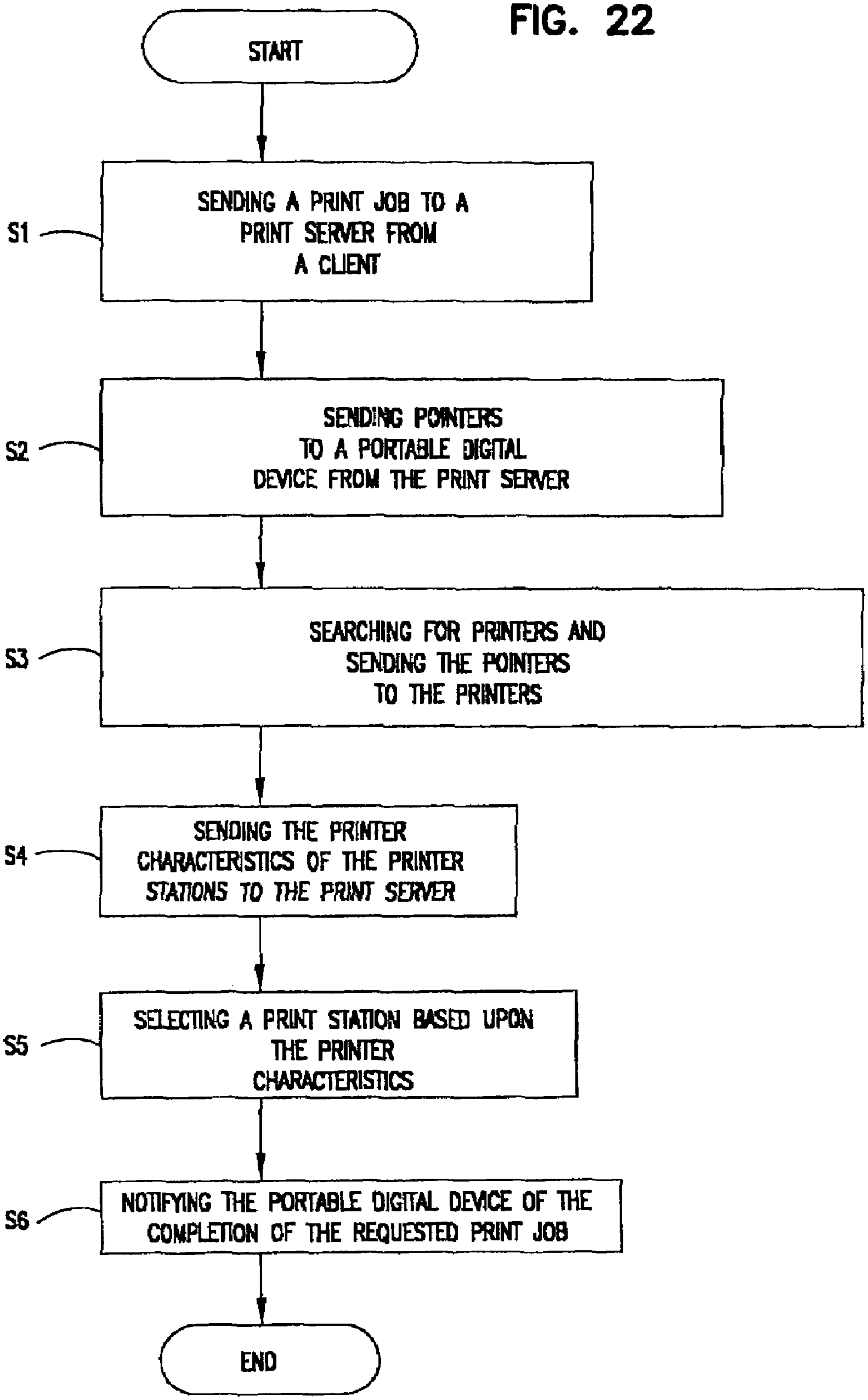
FIG. 22 is a flow chart illustrating common acts performed by the above described fifth, sixth and seventh preferred embodiments of the remote printing system according to the current invention.

Now referring to FIG. 22, a flow chart illustrates common acts performed by the above described fifth, sixth and seventh preferred embodiments of the remote printing system according to the current invention. To describe the acts in the preferred process, although the components of the remote print system are referenced, the reference is strictly exemplary and the acts may be performed by means other than the referenced components. In a step 1, after an author prepares a document in the client device 14, the author issues a print-send command so that the document will be remotely printed and delivered to an intended receiver. The print-send command causes the document to be temporarily stored in a user area of the print server 13-2. Although the data format of the document is not limited to a particular form, it is desired that the data format is a widely used format such as PS or PDF formats. In a step 2, the print server 13-2 transmits e-mail to the intended receiver via the portable digital device 11-1, and the e-mail includes the print data pointer and other information such as comments. In response to the e-mail print notice, the portable digital device 11-1 now searches an appropriate print station by broadcasting a wireless signal in the vicinity in a step 3. The wireless signal includes information on the print server 13-2 that has been sent in the e-mail print notice. In a step 4, in response to the wireless signal, the print stations each send their print characteristics to the print server 13-2. Based upon the reply information on the printer characteristics and others, the print server 13-2 now selects an appropriate print station in a step 5. The selection criteria include a number of factors including the location of the print station in relation to the portable digital device 11-1 and the print parameters that are provided in the e-mail print notice. The print parameters include a type of printing such as color, a speed of the printer and a number of copies. The print server 13-2 transmits the print data to the selected print station in the step 5. Finally, upon completion of the print-send command, the print server 13-2 sends another e-mail to the portable digital device 11-1 to notify that the previously issued print-send command has been completed in a step 6. Then the preferred then process terminates.

Figure 23A:
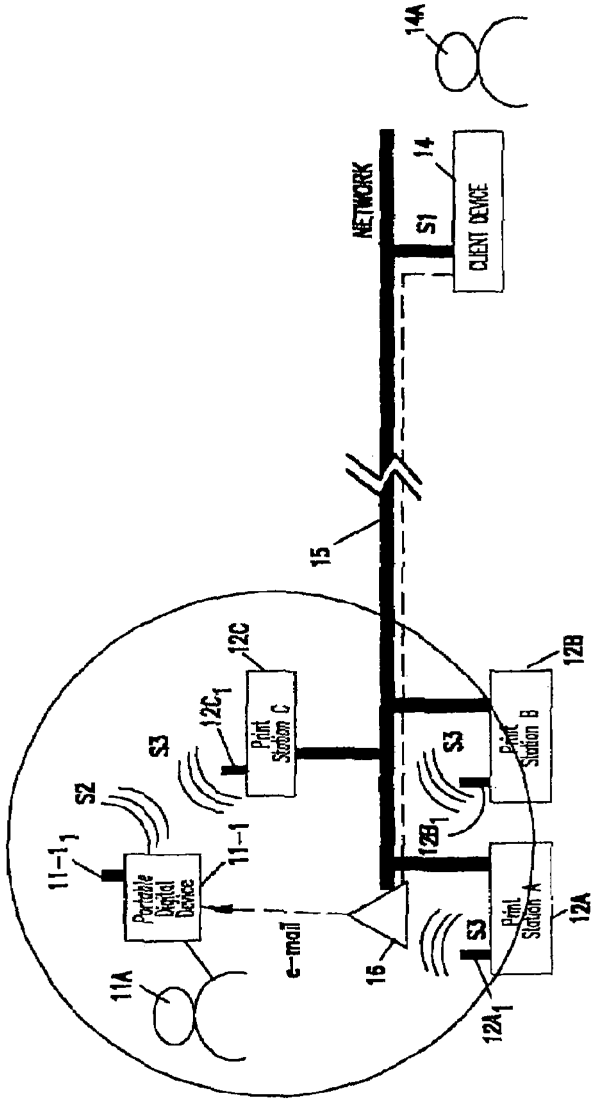
FIGS. 23A and 23B are diagrams illustrating components and their sequential interactions in an eighth preferred embodiment of the remote printing system according to the current invention.
Figure 23B:
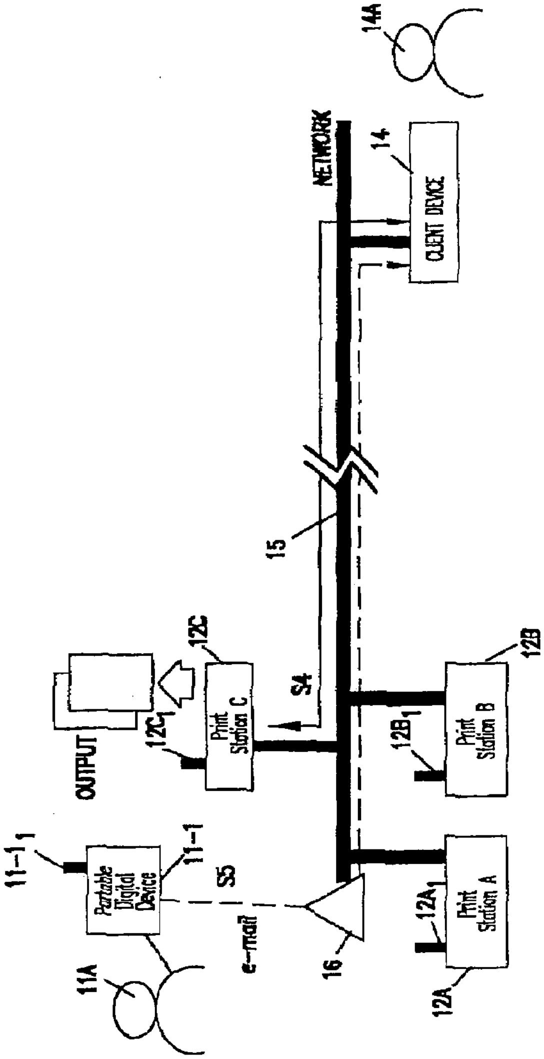

Now referring to FIGS. 23A and 23B, diagrams illustrate components and their sequential interactions in an eighth preferred embodiment of the remote printing system according to the current invention. The eighth preferred embodiment includes the substantially identical components as described in the first preferred embodiment as shown in FIGS. 1 through 6 except for the client device 14, the portable digital device 11-1 and the lack of the print server 13-2. The remote printing system includes the client device 14, a plurality of print stations 12A, 12B and 12C, an access point or wireless transmitter/receiver 16 as well as the portable digital device 11-1. In general, except for the portable digital device 11-1, all of the above components of the remote printing system are connected physically as well as wirelessly to a cable network 15. The portable digital devices 11-1 include a cellular phone, a note-size computer and a personal digital assistant (PDA). The portable digital device 11-1 is wirelessly connected to the network 15 via a wireless communication unit 11-1 and the access point 16. The access point 16 is a relay-station between the cable network 15 and a wireless communication device. The print stations 12A, 12B and 12C each have a corresponding wireless communication unit $\mathbf{12}A_1$, $\mathbf{12}B_1$ or $\mathbf{12}C_1$ to wirelessly communicate with the portable digital device 11-1, and the print stations 12A, 12B and 12C also directly communicate with other components via the network 15. Furthermore, the print stations 12A, 12B and 12C are either color or black-and-white printers and may share a common page description language or PDL with the client device 14. The client device 14 further includes a print manager unit for managing print requests or print jobs in a print queue and sending each of the print jobs to a specified one of the print stations 12A, 12B and 12C. During the course of printing, if any of the print stations 12A, 12B and 12C develops a problem such as a paper jam, the client device 14 retransmits the print job to the restored print station. When a print job is completed in a normal fashion, the client device 14 releases the corresponding print job from the print queue. The client device 14 includes a personal computer and a workstation.

Referring particularly to FIG. 23A, an author 14*a* prepares a document at the client device 14 and issues a print-send command in order to send a hard copy of the document to a carrier 11*a* of the portable digital device 11-1. As a result of the above described print-send command, the client device 14 stores the document copy in its user area. The format such as PDL of the print data does not have to be any predetermined format. However, it is preferred that the print data format is a widely used or known format. At the same time, as a result of the print-send command, the client device 14 also wirelessly transmits an e-mail notice directly to the portable digital device 11-1 via the access point 16 as indicated by an arrow S1. The e-mail notice includes a print data pointer that refers to an address in the user data storage area in the client device 14, a corresponding print job name and a client name. In response to the e-mail print notice, the portable digital device 11-1 transmits a first wireless signal in a predetermined area in search of a print station as indicated by a set of three waves S2 towards the print stations 12A, 12B and 12C. The portable digital device 11-1 in the eighth preferred embodiment transmits the first wireless signal that reaches each of the print stations 12A, 12B and 12C in a circled area that is wider than that of the first preferred embodiment. The first wireless signal includes information such as the print data pointer that has been sent in the e-mail print notice. Upon receiving the first wireless signal, the print stations 12A, 12B and 12C each wirelessly send the portable digital device 11-1 information related to their print characteristics as indicated in three sets of waves S3 via the communication units $\mathbf{12}A_1$, $\mathbf{12}B_1$ and $\mathbf{12}C_1$. The print characteristics include information on the print status that takes a predetermined value of READY or BUSY, the paper size, the printing speed in prints per minute, the color/monochrome value, the resolution value as well as the network address.

Now referring particularly to FIG. 23B, after the above described acts as indicated by the arrows and waves S1 through S3, the eighth preferred embodiment of the remote printing system further perform the following acts to complete the print-send command. As indicated by the transmission S3 in FIG. 23A, the portable digital device 11-1 receives the print characteristic information from the three print stations 12A, 12B and 12C. Based upon the received print characteristic information, the portable digital device 11-1 selects the most appropriate print station for the pending print-send command. One example of the selection is that if the pending print-send command requires a color hard copy and only one of the responded print stations is capable of printing in color, the portable digital device 11-1 selects the color print station. In this example, the portable digital device 11-1 selects the print station 12C for the pending print-send command, and the client device 14 sends via the network 15 the corresponding print data to the selected print station 12C as indicated by the transmission S4. In response to the print data transmission S4, the selected print station 12C outputs a hard copy. Simultaneously with or subsequently to the transmission S4, the portable digital device 11-1 transmits via the network 15 and the access point 16 another e-mail as indicated by an arrow S5 to the client device 14 to notify where the hard copy is available and as to when the print has been completed.

Alternatively, the portable digital device 11-1 simply selects a first responded print station, a first available print station or a print station with the least amount of expected time to complete the print job. Furthermore, a portable digital device of an alternative embodiment to the eighth preferred embodiment includes a reception signal measuring unit for measuring the strength of the reception signal. Based upon the measured signal strength, the alternative preferred embodiment of the portable digital device also selects a print station. With the use of Class 3, BlueTooth transmission protocol, the above described signal strength is used distinguishing for the print stations that are located within 10 meters from each other. In addition, a client device of an alternative embodiment to the eighth preferred embodiment sends the print data of a certain size as an attachment to the initial e-mail notice to the portable digital device 11-1.

Figure 24A:
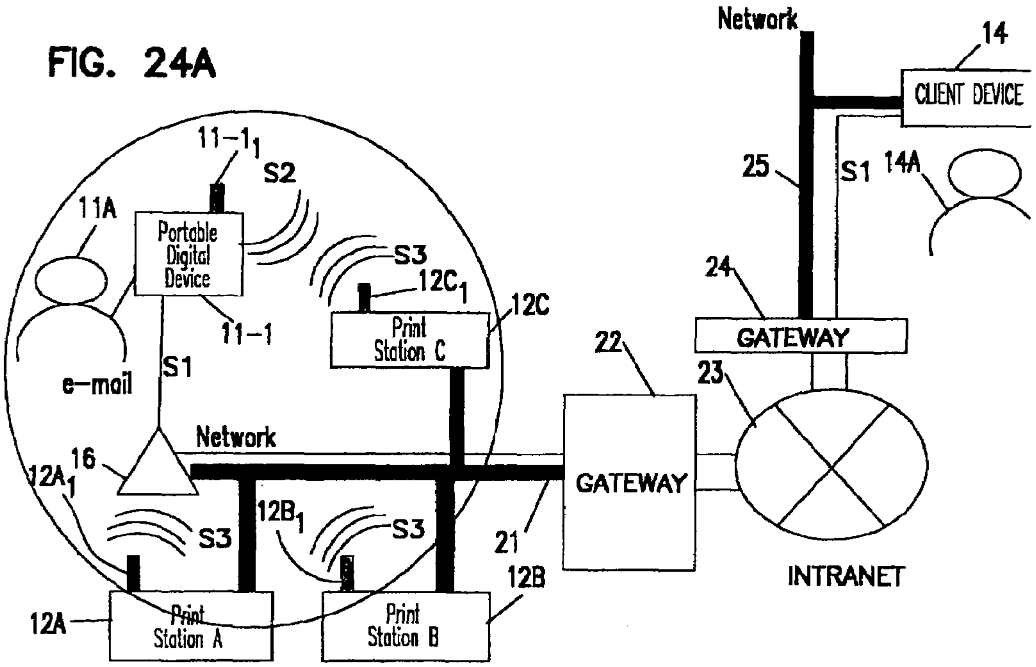
FIGS. 24A and 24B are diagrams illustrating components and their sequential interactions in a ninth preferred embodiment of the remote printing system according to the current invention.
Figure 24B:
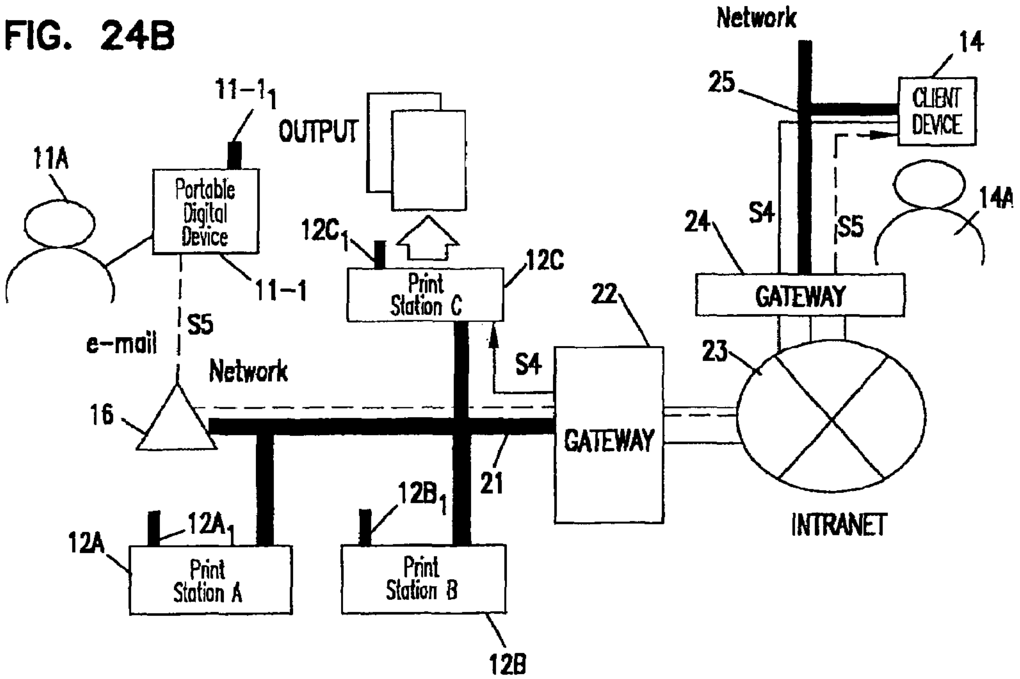

Now referring to FIGS. 24A and 24B, diagrams illustrate components and their sequential interactions in a ninth preferred embodiment of the remote printing system according to the current invention. In general, the components of the ninth preferred embodiment are substantially identical to those referred by the same reference numerals in the previous figures. The ninth preferred embodiment additionally includes a pair of gateways 22 and 24, the Intranet 23. The networks 21 and 25 connect the components of the ninth preferred embodiment via the gateways 22, 24, the Intranet 23. One suitable application of the sixth preferred embodiment is the remote printing system where the client device 14 and the print stations 12A, 12B and 12C are located in separate buildings that are generally in the geographical proximity. In order for the client device 14 to send data to one of the print stations 12A, 12B and 12C, the client device 14 transmits via the network 25 the data to the first gateway 24, which is connected to the Intranet 23. The data is routed the second gateway 22 via the Intranet 23 and is further transmitted to an intended print station via the network 21.

Referring particularly to FIG. 24A, an author 14*a* prepares a document at the client device 14 and issues a print-send command in order to send a hard copy of the document to a carrier 11*a* of the portable digital device 11-1. As a result of the above described print-send command, the client device 14 stores the document copy in its user area. The format such as PDL of the print data does not have to be any predetermined format. However, it is preferred that the print data format is a widely used or known format. At the same time, as a result of the print-send command, the client device 14 transmits through the Intranet 23 an e-mail notice to the portable digital device 11-1 via the access point 16 as indicated by an arrow S1. The e-mail notice includes a print data pointer that refers to an address in the user data storage area in the client device 14, a corresponding print job name and a client name. In response to the e-mail print notice, the portable digital device 11-1 transmits a first wireless signal in a predetermined area in search of a print station as indicated by a set of three waves S2 towards the print stations 12A, 12B and 12C. The portable digital device 11-1 in the ninth preferred embodiment transmits the first wireless signal that reaches each of the print stations 12A, 12B and 12C in a circled area that is wider than that of the first preferred embodiment. The first wireless signal includes information such as the print data pointer that has been sent in the e-mail print notice. Upon receiving the first wireless signal, the print stations 12A, 12B and 12C each wirelessly transmits the portable digital device 11-1 information that is related to their print characteristics as indicated in an arrow S3 via the communication units 12$A_1$, 12$B_1$ and 12$C_1$. The print characteristics include information on the print status that takes a predetermined value of READY or BUSY, the paper size, the printing speed in prints per minute, the color/monochrome value, the resolution value as well as the network address.

Now referring particularly to FIG. 24B, after the above described acts as indicated by the arrows and waves S1 through S3, the ninth preferred embodiment of the remote printing system further perform the following acts to complete the print-send command. As indicated by the transmission S3 in FIG. 24A, the portable digital device 11-1 receives the print characteristic information from the three print stations 12A, 12B and 12C. Based upon the received print characteristic information, the portable digital device 11-1 selects the most appropriate print station for the pending print-send command. One example of the selection is that if the pending print-send command requires a color hard copy and only one of the responded print stations is capable of printing in color, the portable digital device 11-1 selects the color print station. In this example, the portable digital device 11-1 selects the print station 12C for the pending print-send command, and the client device 14 sends through the networks 21 and 25 the corresponding print data to the selected print station 12C via the gateway 24, the Intranet 23 and the gateway 22 as indicated by the transmission S4. Alternatively, the portable digital device 11-1 simply selects a first responded print station, a first available print station or a print station with the least amount of expected time to complete the print job. In response to the print data transmission S4, the selected print station 12C outputs a hard copy. Simultaneously with or subsequently to the transmission S4, the portable digital device 11-1 transmits via the networks 21 and 25 another e-mail as indicated by an arrow S5 to the client device 14 via the access point 16, the gateways 22, 24 and the Intranet 23 to notify as to where the hard copy is available and as to when the print has been completed.

Figure 25A:
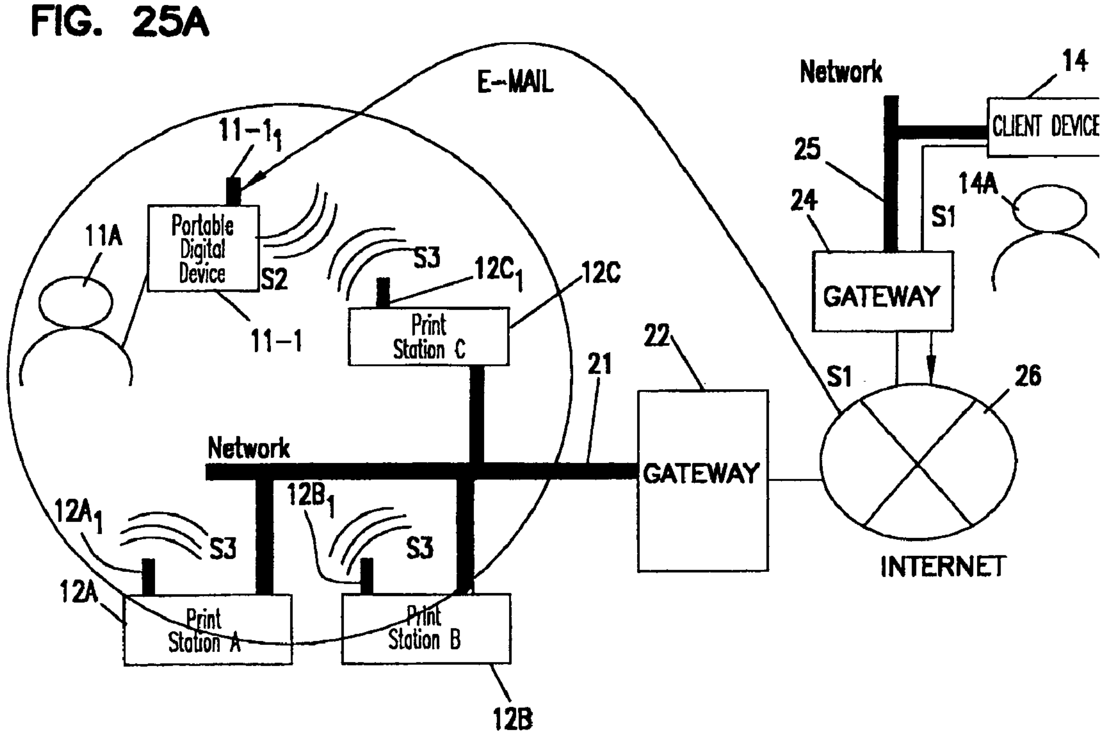
FIGS. 25A and 25B are diagrams illustrating components and their sequential interactions in a tenth preferred embodiment of the remote printing system according to the current invention.
Figure 25B:
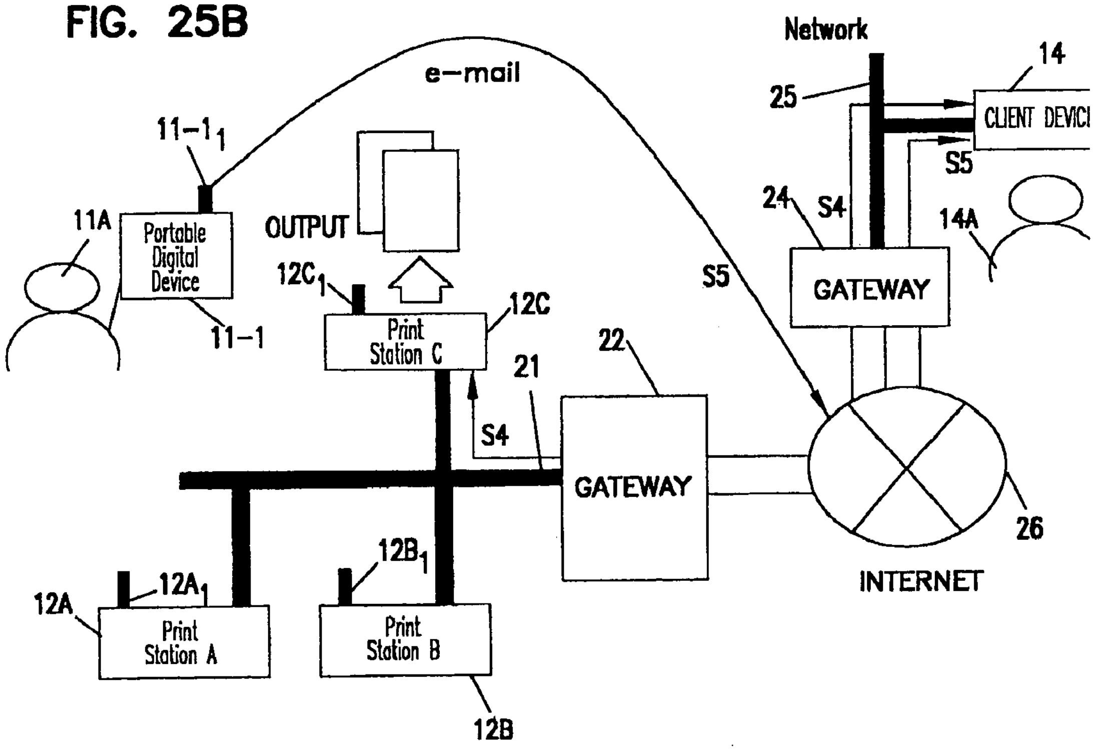

Now referring to FIGS. 25A and 25B, diagrams illustrate components and their sequential interactions in a tenth preferred embodiment of the remote printing system according to the current invention. In general, the components of the tenth preferred embodiment are substantially identical to those referred by the same reference numerals in the previous figures. The tenth preferred embodiment additionally includes a pair of gateways 22 and 24 as well as the Internet 26. The networks 21 and 25 connect the components of the tenth preferred embodiment via the gateways 22, 24 and the Internet 26. One suitable application of the tenth preferred embodiment is the remote printing system where the client device 14 and the print stations 12A, 12B and 12C are located in separate locations that are not necessarily in the geographical proximity. In order for the client device 14 to send data or e-mail to one of the print stations 12A, 12B and 12C, the client device 14 transmits via the network 25 the data to the first gateway 24, which is connected to the Internet 26. The data is routed the second gateway 22 via the Internet 26 and is further transmitted to an intended print station via the network 21. In general, the data or the e-mail is delivered through an e-mail service provider.

Referring particularly to FIG. 25A, an author 14*a* prepares a document at the client device 14 and issues a print-send command in order to send a hard copy of the document to a carrier 11*a* of the portable digital device 11-1. As a result of the above described print-send command, the client device 14 stores the document copy in its user area. The format such as PDL of the print data does not have to be any predetermined format. However, it is preferred that the print data format is a widely used or known format. At the same time, as a result of the print-send command, the client device 14 transmits through the public network 26 an e-mail notice to the portable digital device 11-1 via the gateway 24 and the network 25 as indicated by an arrow S1. The e-mail notice includes a print data pointer that refers to an address in the user data storage area in the client device 14, a corresponding print job name and a client name. In response to the e-mail print notice, the portable digital device 11-1 transmits a first wireless signal in a predetermined area in search of a print station as indicated by a set of three waves S2 towards the print stations 12A, 12B and 12C. The portable digital device 11-1 in the tenth preferred embodiment transmits the first wireless signal that reaches each of the print stations 12A, 12B and 12C in a circled area that is wider than that of the first preferred embodiment. The first wireless signal includes information such as the print data pointer that has been sent in the e-mail print notice. Upon receiving the first wireless signal, the print stations 12A, 12B and 12C each wirelessly transmit the portable digital device 11-1 information related to their print characteristics as indicated in three sets of waves S3. The print characteristics include information on the print status that takes a predetermined value of READY or BUSY, the paper size, the printing speed in prints per minute, the color/monochrome value, the resolution value as well as the network address.

Now referring particularly to FIG. 25B, after the above described acts as indicated by the arrows and waves S1 through S3, the tenth preferred embodiment of the remote printing system further perform the following acts to complete the print-send command. As indicated by the transmission S3 in FIG. 25A, the portable digital device 11-1 receives the print characteristic information from the three print stations 12A, 12B and 12C. Based upon the received print characteristic information, the portable digital device 11-1 selects the most appropriate print station for the pending print-send command. One example of the selection is that if the pending print-send command requires a color hard copy and only one of the responded print stations is capable of printing in color, the portable digital device 11-1 selects the color print station. In this example, the portable digital device 11-1 selects the print station 12C for the pending print-send command. The client device 14 sends through the networks 25 and 21 the corresponding print data to the selected print station 12C via the gateway 24, the Internet 26 and the gateway 22 as indicated by the transmission S4. Alternatively, the portable digital device 11-1 simply selects a first responded print station, a first available print station or a print station with the least amount of expected time to complete the print job. In response to the print data transmission S4, the selected print station 12C outputs a hard copy. Simultaneously with or subsequently to the transmission S4, the portable digital device 11-1 also transmits another e-mail as indicated by an arrow S5 to the client device 14 via the public network 26 to notify as to where the hard copy is available and as to when the print has been completed.

Figure 26:
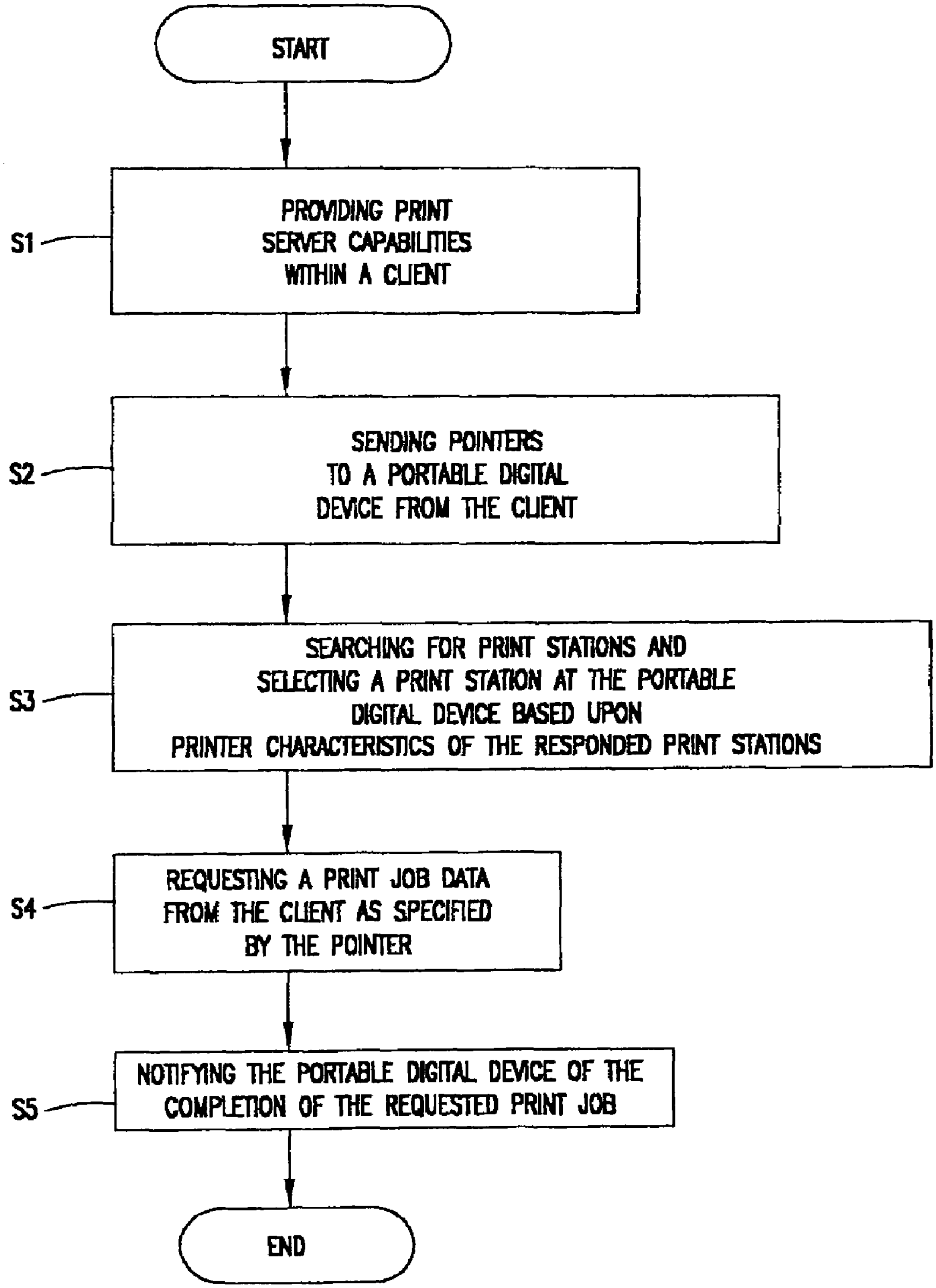
FIG. 26 is a flow chart illustrating common acts performed by the above described eighth, ninth and tenth preferred embodiments of the remote printing system according to the current invention.

Now referring to FIG. 26, a flow chart illustrates common acts performed by the above described eighth, ninth and tenth preferred embodiments of the remote printing system according to the current invention. To describe the acts in the preferred process, although the components of the remote print system are referenced, the reference is strictly exemplary and the acts may be performed by means other than the referenced components. In a step 1, after an author prepares a document in the client device 14, the author issues a print-send command so that the document will be remotely printed and delivered to an intended receiver. The print-send command causes the document to be temporarily stored in a user area of the client device 14. Although the data format of the document is not limited to a particular form, it is desired that the data format is a widely used format such as PS or PDF formats. In a step 2, the client device 14 initiates an e-mail print notice to the intended receiver via the portable digital device 11-1, and the e-mail includes the print data pointer and other information such as comments. In response to the e-mail print notice, the portable digital device 11-1 now searches an appropriate print station by broadcasting a wireless signal in the vicinity in a step 3. In response to the search signal, the print stations each wirelessly transmit their print characteristics to the portable digital device 11-1 also in the step 3. Based upon the transmitted print characteristics, the portable digital device 11-1 selects a print station still in the step 3. The selection criteria include a number of factors including the location of the print station in relation to the portable digital device 11-1 and the print parameters that are provided in the e-mail print notice. The print parameters include a type of printing such as color, a speed of the printer and a number of copies. The client device 14 transmits the print data to the selected print station in the step 4. Finally, upon completion of the print-send command, the portable digital device 11-1 sends another e-mail to the client device 14 to notify that the previously issued print-send command has been completed in a step 5. Then the preferred then process terminates.

As described above, the preferred and alternative embodiments of the remote printing system according to the current invention enables to deliver a hard copy to a remote user without a powerful portable digital device.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of printing information at a convenient location, comprising:

providing a plurality of print stations in a predetermined area, the print stations being networked to a print server which stores information to be printed;

sending a first wireless signal from a portable digital device directly to the print stations in the predetermined area;

selecting at least one of the print stations based upon a predetermined criterion;

sending a selected printer signal from the selected print station to the print server;

converting the information into a format acceptable at the selected print station;

receiving the information in the converted format to be printed at the selected print station from the print server; and printing the information at the selected print station.

2. The method of printing information at a convenient location according to claim 1 further comprising:

sending from the print server to the portable digital device a second wireless signal indicative of the information prior to sending the first wireless signal;

sending the second wireless signal from the portable digital device to the selected print station prior to said printing the information; and receiving the information at the selected print station from the print server based upon content of the second wireless signal after said sending the second wireless signal from the portable digital device to the selected print station and prior to said printing the information.

3. The method of printing information at a convenient location according to claim 2 wherein the second wireless signal is sent to the portable digital device directly from the printer server.

4. The method of printing information at a convenient location according to claim 2 wherein the second wireless signal includes a pointer to a file where the information is stored.

5. The method of printing information at a convenient location according to claim 2 wherein the second wireless signal includes printer requirements for printing the information is stored.

6. The method of printing information at a convenient location according to claim 2 wherein the second wireless signal includes origination information on the information.

7. The method of printing information at a convenient location according to claim 2 wherein the second wireless signal includes a client name for the information to be delivered.

8. The method of printing information at a convenient location according to claim 2 wherein the second wireless signal includes a brief description of the information to be printed.

9. The method of printing information at a convenient location according to claim 1 when more than one print station is selected: gathering printer information on each of the selected print stations, the printer information including status information and color print information; and further selecting one of the print stations based upon the printer information prior to said printing the information.

10. The method of printing information at a convenient location according to claim 1 wherein the first wireless signal is non-directional.

11. The method of printing information at a convenient location according to claim 1 wherein the print stations are networked to the print server via the Internet.

12. The method of printing information at a convenient location according to claim 1 wherein the print stations are networked to the print server via an intranet.

13. The method of printing information at a convenient location according to claim 1 wherein the predetermined area is an area within a predetermined building.

14. The method of printing information at a convenient location according to claim 1 wherein the predetermined area is an area containing a plurality of predetermined buildings.

15. The method of printing information at a convenient location according to claim 1 wherein the printer server selects at least the one of the print stations based upon the positional relation.

16. The method of printing information at a convenient location according to claim 1 wherein the portable digital device selects at least the one of the print stations based upon the positional relation.

17. The method of printing information at a convenient location according to claim 1 wherein a user selects at least the one of the print stations.

18. The method of printing information at a convenient location according to claim 1 wherein the positional relation is determined based upon a current position of the portable digital device with respect to a predetermined map of the print stations.

19. The method of printing information at a convenient location according to claim 1 further comprising an additional step of sending a third wireless signal from each of the print stations in response to the first wireless signal and wherein the positional relation is determined at the portable digital device based upon reception strength of the third wireless signal.

20. The method of printing information at a convenient location according to claim 1 further comprising an additional step of notifying a completion of said printing step to a client.

21. A system for printing information at a convenient location, comprising:

a print server storing information to be printed;

a plurality of print stations connected to said print server in a predetermined area; and a portable digital device sending a first wireless signal directly to each of said print stations in the predetermined area;

wherein said print server determines at least a positional relation between said portable digital device and each of said print stations in response to the first wireless signal, the system selecting at least one of said print stations based upon at least the positional relation, said selected print station sending a selected print station signal to said print server, in response to the selected print station signal, said printer server converting the information into a data format acceptable to said selected print station, said selected print station receiving the information from said print server, and said selected print station printing the received information.

22. The system for printing information at a convenient location according to claim 21 wherein said print server sends said portable digital device a second wireless signal indicative of the information, said portable digital device sending the first wireless signal in response to the second wireless signal.

23. The system for printing information at a convenient location according to claim 21 wherein said portable digital device further sending the second wireless signal to the selected print station prior to printing the information, said selected print station subsequently receiving the information from said print sever based upon content of the second wireless signal.

24. The system for printing information at a convenient location according to claim 22 wherein said printer server is connected to the Internet and the second wireless signal is sent to said portable digital device via the Internet.

25. The system for printing information at a convenient location according to claim 22 wherein the second wireless signal includes a pointer to a file where the information is stored.

26. The system for printing information at a convenient location according to claim 22 wherein the second wireless signal includes printer requirements for printing the information is stored.

27. The system for printing information at a convenient location according to claim 22 wherein the second wireless signal includes origination information on the information.

28. The system for printing information at a convenient location according to claim 22 wherein the second wireless signal includes a client name for the information to be delivered.

29. The system for printing information at a convenient location according to claim 22 wherein the second wireless signal includes a brief description of the information to be printed.

30. The system for printing information at a convenient location according to claim 21 wherein the system gathers printer information on each of the selected print stations when more than one print station is selected, the printer information including status information and color print information, the system further selecting one of the print stations based upon the printer information prior to printing the information.

31. The system for printing information at a convenient location according to claim 21 wherein the first wireless signal is non-directional.

32. The system for printing information at a convenient location according to claim 21 wherein said print stations are networked to said print server via the Internet.

33. The system for printing information at a convenient location according to claim 21 wherein said print stations are networked to said print server via an intranet.

34. The system for printing information at a convenient location according to claim 21 wherein the predetermined area is an area within a predetermined building.

35. The system for printing information at a convenient location according to claim 21 wherein the predetermined area is an area containing a plurality of predetermined buildings.

36. The system for printing information at a convenient location according to claim 21 wherein said print server selects at least the one of the print stations based upon the positional relation.

37. The system for printing information at a convenient location according to claim 21 wherein said portable digital device selects at least the one of the print stations based upon the positional relation.

38. The system for printing information at a convenient location according to claim 21 further comprising a user display for displaying a plurality of said print stations to a user for selecting at least the one of the print stations.

39. The system for printing information at a convenient location according to claim 21 wherein the positional relation is determined based upon a current position of said portable digital device with respect to a predetermined map of said print stations.

40. The system for printing information at a convenient location according to claim 21 wherein each of said print stations sends a third wireless signal in response to the first wireless signal, said portable digital device determining the positional relation based upon reception strength of the third wireless signal at said portable digital device.

41. The system for printing information at a convenient location according to claim 21 wherein said printer server notifies a completion of said printing step to a client.

42. A system for printing information at a convenient location, comprising:

a print server storing information to be printed;

a portable digital device having a wireless communication unit for sending a first wireless non-directional signal in the predetermined area; and a plurality of print stations each having a wireless communication unit for wirelessly communicating directly with said portable digital device in a predetermined area, said print stations being networked with said print server;

wherein said print server determining at least a positional relation between said portable digital device and each of said print stations in response to the first wireless non-directional signal, said print server selecting one of said print stations that is the closest to said portable digital device based upon the positional relation, said selected print station sending a selected print station signal to said print server, in response to the selected print station signal, said printer server converting the information into a data format acceptable to said selected print station, said selected print station receiving the information from said print server, and said selected print station printing the received information.

43. The system for printing information at a convenient location according to claim 42 wherein said print server is a client device.

* * * * *